US009806926B2

(12) United States Patent
Xu et al.

(10) Patent No.: US 9,806,926 B2
(45) Date of Patent: Oct. 31, 2017

(54) MULTISTAGE BEAMFORMING OF MULTIPLE-ANTENNA COMMUNICATION SYSTEM

(71) Applicant: Samsung Electronics Co., Ltd., Suwon-si, Gyeonggi-do (KR)

(72) Inventors: Gang Xu, Allen, TX (US); Young Han Nam, Plano, TX (US); Yang Li, Plano, TX (US); Yan Xin, Princeton, NJ (US); Jianzhong Zhang, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 14/526,284

(22) Filed: Oct. 28, 2014

(65) Prior Publication Data

US 2015/0124688 A1   May 7, 2015

Related U.S. Application Data

(60) Provisional application No. 61/932,663, filed on Jan. 28, 2014, provisional application No. 61/899,738, filed on Nov. 4, 2013.

(51) Int. Cl.
*H04L 27/26* (2006.01)
*H04B 7/0452* (2017.01)
(Continued)

(52) U.S. Cl.
CPC ....... *H04L 27/2607* (2013.01); *H04B 7/0452* (2013.01); *H04B 7/0617* (2013.01);
(Continued)

(58) Field of Classification Search
CPC .. H04B 7/0413; H04B 7/0452; H04B 7/0617; H04B 7/0626; H04B 7/0639;
(Continued)

(56) References Cited

U.S. PATENT DOCUMENTS

| 8,705,483 B2 * | 4/2014 | Liu ............. H04L 5/0023 370/329 |
| 2007/0189405 A1 * | 8/2007 | Qu ............. H04L 27/02 375/260 |

(Continued)

FOREIGN PATENT DOCUMENTS

| EP | 2088726 A1 | 8/2009 |
| WO | 2013/089525 A1 | 6/2013 |

OTHER PUBLICATIONS

International Search Report dated Apr. 9, 2015 in connection with International Patent Application No. PCT/KR2015/000858, 4 pages.

(Continued)

*Primary Examiner* — Marsha D. Banks Harold
*Assistant Examiner* — Dharmesh Patel

(57) ABSTRACT

A multistage beamforming circuit includes a data unit that implements a frequency domain beamforming stage and a remote radio head that implements a time-domain broadband beamforming stage. The data unit implements the frequency domain beamforming stage by converting K received data streams into M precoding output streams in a frequency-domain. The data unit is configured to transform the M output streams to M OFDM time-domain signals. The remote radio head, or integrated radio unit is configured to implement a time-domain broadband beamforming stage by converting the M OFDM time-domain signals into N transmit streams of time-domain samples. The remote radio head, or integrated radio unit includes a transmit antenna array configured to transmit the N transmit streams that together form broadcast beams and user-specific beams. The antenna array includes a plurality of physical antennas. The number N of transmit streams is greater than the number M of precoding output streams.

22 Claims, 10 Drawing Sheets

(51) Int. Cl.
 *H04B 7/06* (2006.01)
 *H04L 5/00* (2006.01)
(52) U.S. Cl.
 CPC ......... *H04B 7/0626* (2013.01); *H04B 7/0639* (2013.01); *H04L 27/2634* (2013.01); *H04L 27/2647* (2013.01); *H04L 5/005* (2013.01); *H04L 5/0051* (2013.01)
(58) Field of Classification Search
 CPC ..... H04L 1/0025; H04L 5/0003; H04L 5/005; H04L 5/0023; H04L 5/0051; H04L 27/2601; H04L 27/2607; H04L 27/2626; H04L 27/2634; H04L 27/2647; H01Q 1/246; H01Q 21/061; H04W 72/005; H04W 88/08
 See application file for complete search history.

(56) References Cited

U.S. PATENT DOCUMENTS

| | | | |
|---|---|---|---|
| 2008/0303701 A1* | 12/2008 | Zhang | H04B 7/0456 341/106 |
| 2009/0290657 A1 | 11/2009 | Howard et al. | |
| 2010/0041392 A1* | 2/2010 | Hirata | H04W 24/04 455/425 |
| 2011/0216846 A1* | 9/2011 | Lee | H04B 7/0473 375/295 |
| 2012/0008587 A1 | 1/2012 | Lee, II et al. | |
| 2012/0122472 A1* | 5/2012 | Krishnamurthy | H04L 5/0053 455/456.1 |
| 2013/0022143 A1 | 1/2013 | Ko et al. | |
| 2013/0072247 A1 | 3/2013 | Park et al. | |
| 2013/0286960 A1 | 10/2013 | Li et al. | |
| 2013/0301454 A1 | 11/2013 | Seol et al. | |
| 2013/0328722 A1 | 12/2013 | Wernersson et al. | |

OTHER PUBLICATIONS

Written Opinion of International Searching Authority dated Apr. 9, 2015 in connection with International Patent Application No. PCT/KR2015/000858, 4 pages.

Communication dated Aug. 24, 2017 in connection with European Patent Application No. 15 74 3799.

* cited by examiner

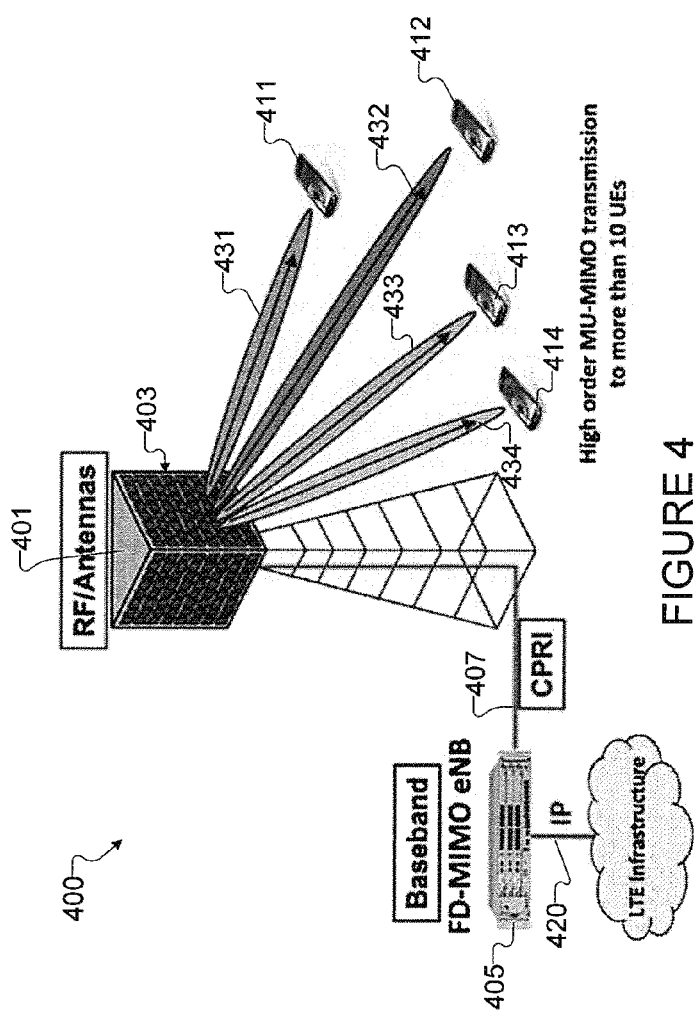
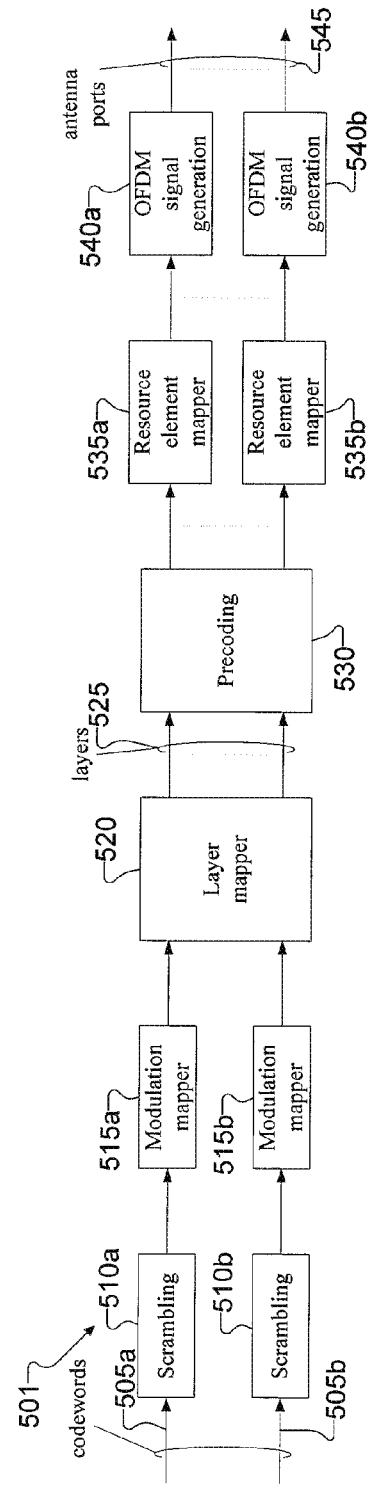
FIGURE 4
FIGURE 5

MULTISTAGE BEAMFORMING OF MULTIPLE-ANTENNA COMMUNICATION SYSTEM

CROSS-REFERENCE TO RELATED APPLICATIONS AND CLAIM OF PRIORITY

The present application claims priority to U.S. Provisional Patent Application Ser. No. 61/932,663, filed Jan. 28, 2014, entitled "MULTISTAGE BEAMFORMING OF MULTIPLE-ANTENNA COMMUNICATION SYSTEMS" and U.S. Provisional Patent Application Ser. No. 61/899,738, filed Nov. 4, 2013, entitled "CHANNEL QUALITY PREDICTION IN ADVANCED WIRELESS COMMUNICATION SYSTEMS". The content of the above-identified patent documents is incorporated herein by reference.

TECHNICAL FIELD

The present application relates generally to wireless communication networks and, more specifically, to a multistage beamforming in a multiple-antenna communication system.

BACKGROUND

The rapid growth of data traffic driven by mobile devices poses challenges on capacity of cellular networks. Multiple-input-multiple-output (MIMO) and multiuser MIMO (MU-MIMO) are technologies introduced in the 3GPP LTE and LTE-advanced standards to improve spectral efficiency. MIMO systems include an enhanced NodeB (eNB) equipped with a linear array with antenna elements placed in a horizontal line, and the eNB exploits spatial diversity in the azimuth (horizontal) domain. An increase in system capacity can be gained by deploying antennas vertically.

SUMMARY

In a first embodiment, a multistage beamforming circuit includes a data unit that implements a frequency selective beamforming stage and a remote radio head that implements a time-domain broadband beamforming stage. The data unit implements the frequency selective beamforming stage by converting K received data streams into M precoding output streams in a frequency-domain. The data unit is configured to transform the M output streams to M orthogonal frequency-division multiplexing (OFDM) time-domain signals. The remote radio head is configured to implement a time-domain broadband beamforming stage by converting the M OFDM time-domain signals into N transmit streams of time-domain samples. The remote radio head includes a transmit antenna array configured to transmit the N transmit streams that together foam broadcast beams and multiple of user-specific narrow beams. The antenna array includes a plurality of physical antennas. The number N of transmitter streams is greater than the number M of precoding output streams.

In a second embodiment, a base station for multistage beamforming in a wireless communication network includes a data unit configured to implement a frequency selective beamforming stage. The data unit includes a frequency domain precoding module configured to receive and precode the K data streams into M precoding output streams in a frequency domain by applying frequency domain precoding matrices. The data unit includes M pairs of an IFFT processing block coupled to M cyclic prefix processing block, and each pair is configured to transform the M output streams into M OFDM time-domain signals. Each IFFT processing block is configured to transform a received frequency-domain signal to a stream of time domain samples. Each cyclic prefix processing block is configured to add a cyclical prefix to the stream of time domain samples to generate the M precoding output stream. The base station includes a remote radio head configured to implement a time-domain broadband beamforming stage by converting the M OFDM time-domain signals into N transmit streams of time-domain samples. The remote radio head signals includes a time-domain broadband beamforming module configured to receive and precode the M output streams into N precoded output signals using a wide-band precoding matrix. The remote radio head signals includes a transmit antenna array configured to transmit the N transmit streams that together form broadcast beams and user-specific narrow beams. The antenna array includes a plurality of physical antennas. The number N of transmitter streams is greater than the number M of independent precoding output streams in the time domain.

In a third embodiment, a multistage beamforming method includes implementing a frequency domain beamforming stage by converting K data streams in a frequency-domain into M precoding output streams in a frequency domain. The method includes transforming the M output streams to M OFDM time-domain signals. The method includes implementing a time-domain broadband beamforming stage by: converting the M OFDM time-domain signals into N transmit streams of time-domain samples; and transmitting, by a transmit antenna array including a plurality of physical antenna, the N transmit streams that together form broadcast beams and user-specific narrow beams. The number N of transmitter streams is greater than the number M of precoding output streams.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates a full-dimension multiple-input-multiple-output (FD-MIMO) communication system according to embodiments of the present disclosure;

FIG. 5 illustrates a 3GPP LTE physical layer processing architecture according to the present disclosure;

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) L. Vuokko, V.-M. Kolmonen, J. Kivinen, and P. Vainikainen, "Results from 5.3 GHz MIMO measurement campaign," presented at COST 273 TD(04)193, Duisburg, 2004 (hereinafter "REF1"); (ii) Alcatel Lucent, Lightradio, at http://www.alcatel-lucent.com/lightradio/ (hereinafter "REF2"); (iii) Young-Han Nam, Boon Loong Ng, Krishna Sayana, Yang Li, Jianzhong (Charlie) Zhang, Younsun Kim and Juho Lee, "Full Dimension MIMO (FD-MIMO) for Next Generation Cellular Technology", Communications Magazine, IEEE, vol. 51, no. 6, pp. 172,179, June 2013 (hereinafter "REF3"); T. L. Marzetta, "Non-cooperative cellular wireless with unlimited numbers of base station antennas", IEEE Trans. Wireless Communications, vol. 9, Issue 11, pp. 3590-3600, November 2010 (hereinafter "REF4"); U.S. Patent Application Publication No. 2013/0301454 A1 entitled "Communication method and apparatus using analog and digital hybrid beamforming" to Ji-Yun Seol et al. (hereinafter "REF5"); and 3GPP TS 36.211: "Evolved Universal Terrestrial Radio Access (E-UTRA); Physical channels and modulation".

FIGS. 1 through 12, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
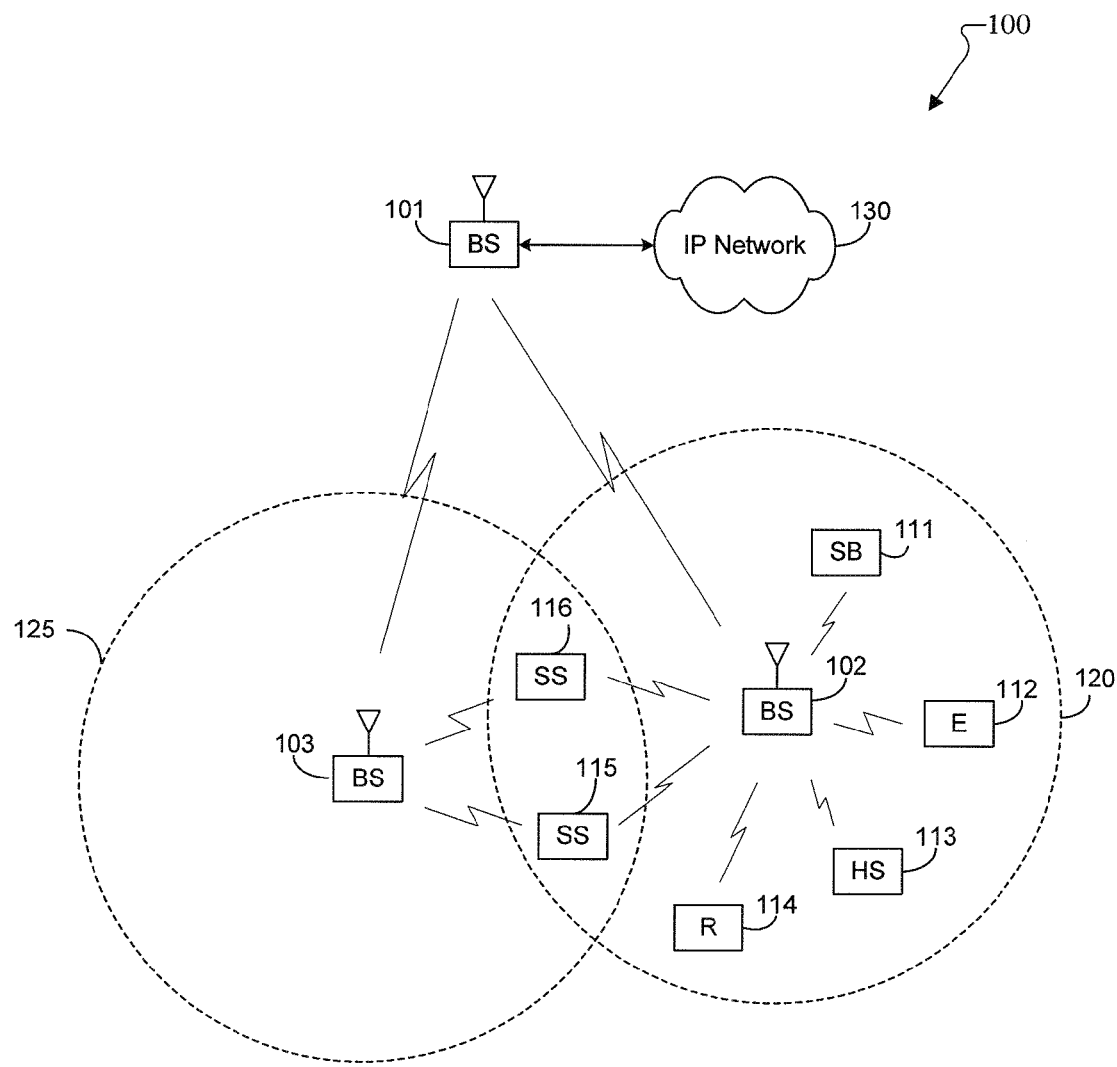
FIG. 1 illustrates an example wireless network according to the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the wireless network 100 (such as the eNBs 101-103) support multistage downlink beamforming architectures.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
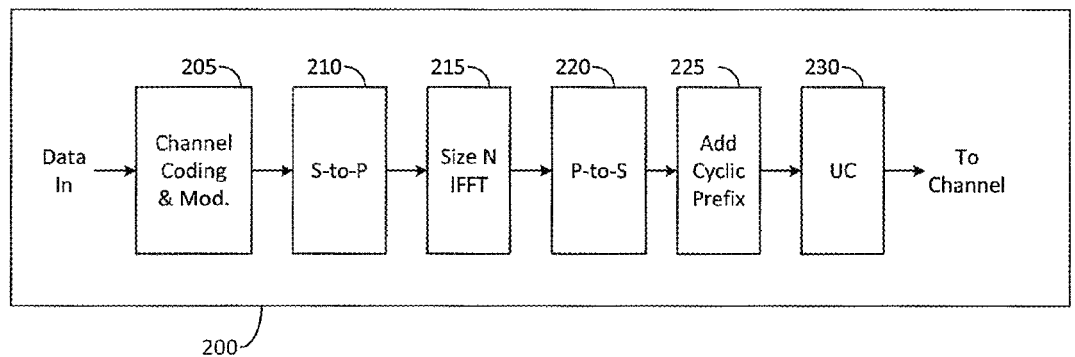
FIGS. 2A and 2B illustrate example wireless transmit and receive paths according to the present disclosure.
Figure 2B:
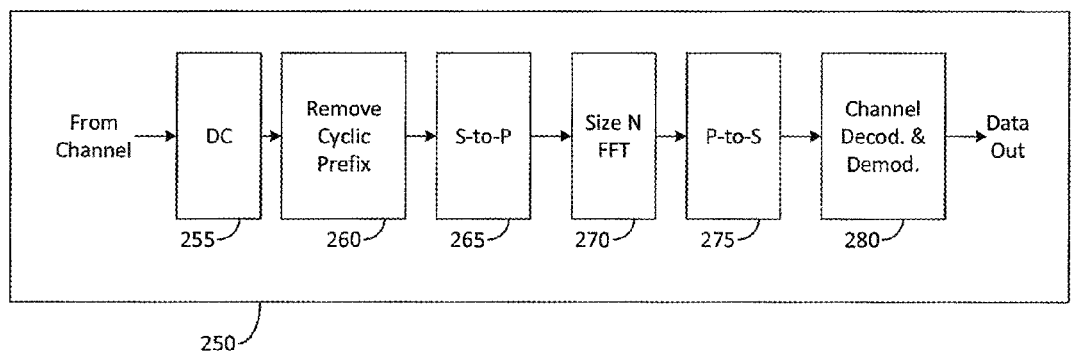

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to support multiple-stage downlink beamforming for a multiple-antenna wireless communication system.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
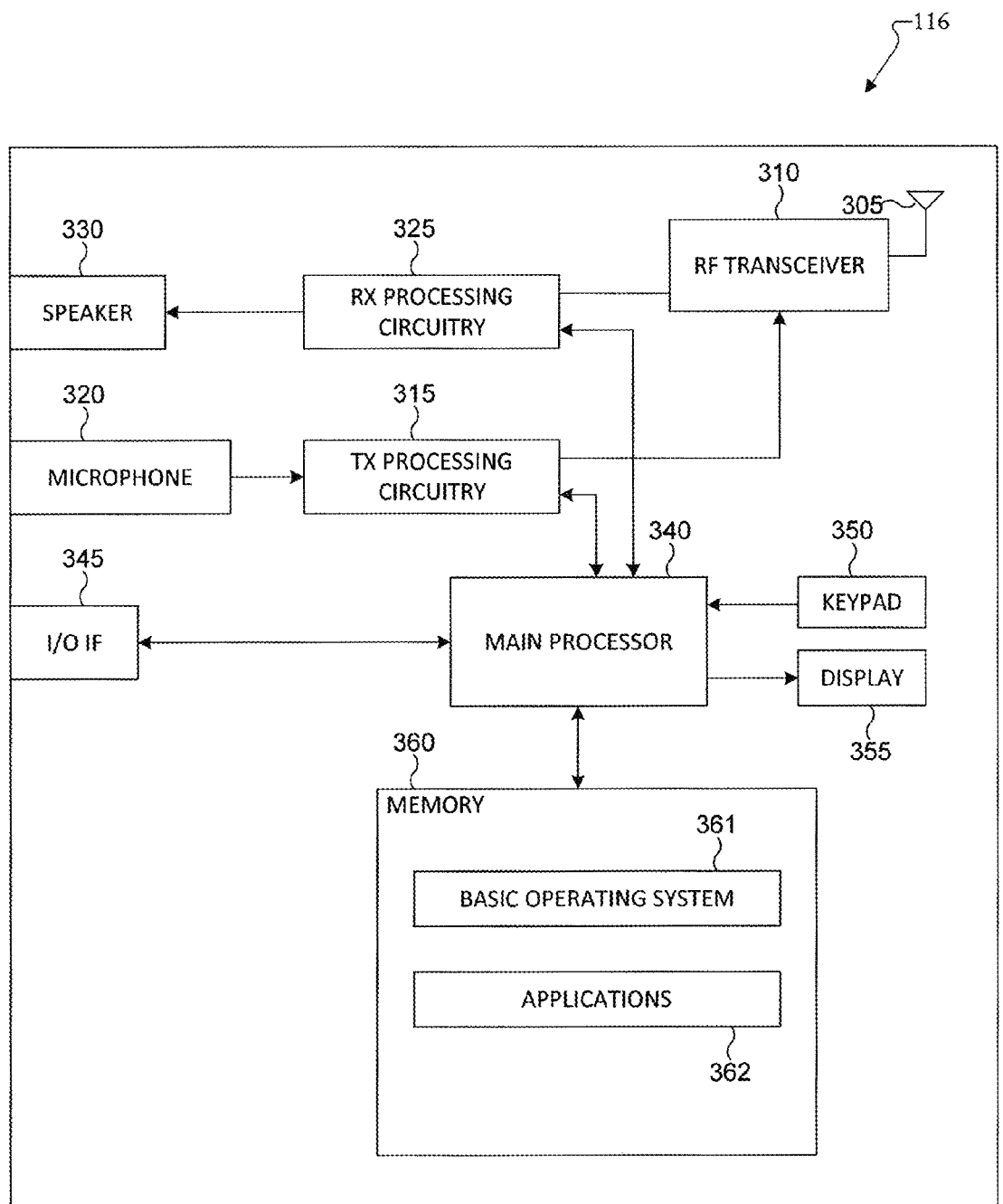
FIG. 3 illustrates an example user equipment according to the present disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for multiple-stage downlink beamforming for a multiple-antenna wireless communication system. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

FIG. 4 illustrates a full-dimension multiple-input-multiple-output (FD-MIMO) communication system according to embodiments of the present disclosure. The embodiment of the FD-MIMO communication system 400 shown in FIG. 4 is for illustration only. Other embodiments could be used without departing from the scope of the present disclosure.

The FD-MIMO communication system 400 includes an eNB 401 and multiple UEs 411-414. The eNB 401 includes one or multiple antenna arrays 403, a baseband unit 405 (BBU), and a common public radio interface (CPRI) 407 that couples the BBU 405 to the antenna arrays 403. The BBU 405 couples the eNB 401 to the LTE infrastructure through an interne protocol (IP) backhaul 420.

According to REF1 and REF2, deploying antennas vertically allows eNBs to utilize diversity in the elevation domain (for example by elevation beamforming), achieving up to 30% gain in system capacity (for example, throughput).

According to REF3, full-dimension MIMO (FD-MIMO) has emerged as a technology to significantly increase system capacity. In FD-MIMO (also referred to as Massive MIMO in REF4), an eNB 401 deploys a large number of active antenna elements in a two-dimension (2D) plane (namely, a 2D active antenna array) as illustrated in FIG. 4. The eNB 401 can form beams in both horizontal and vertical domain, fully exploiting the spatial diversity, and therefore is capable of supporting high-order MU-MIMO. That is, in FD-MIMO, the 2D active antenna array has many active antenna elements, and therefore, it is non-trivial to design an antenna virtualization precoder $w_0$ to maintain a wide-beam pattern.

In one example, the eNB 401 includes three antenna arrays. Each antenna array 403 generates high order MU-MIMO transmission to more than ten (10) UEs. Each antenna array includes a number ($N_V$) arranged vertically as a column and a number ($N_H$) of antennas arranged horizontally as a row. For example, each antenna array 403 includes sixty-four (64) antennas arranged as eight antennas per row and eight antennas per column. The sixty-four antennas form the transmit beam 431 corresponding to the UE 411. For each other UE 412-414, the sixty-four antennas form a corresponding transmit beam 432-434.

In LTE or LTE-A, the UEs 411-414 coupled to the eNB receive control information. To ensure the wide coverage, the eNB 401 uses a special precoder, called antenna virtualization, to control symbols so that the transmission of the control symbols from the eNB 401 has a wide beam width. In certain embodiments, the antenna virtualization precoder can be expressed as $w_0=[w_1, \ldots, w_{Nt}]$, in which case, the eNB 401 transmits a control symbol $s_0^j$ as $x_0^j = w_0 s_0^j$.

Channel quality indictor (CQI) prediction is a challenge associated with antenna virtualization. The CQI is a feedback parameter from UEs that informs the eNB of the overall signal-to-noise ratio (SNR) at the UEs. The CQI impacts transmission schemes, modulation and coding methods, and the like that are selected by the eNB. In LTE/LTE-A, a UE usually derives CQI based on symbols transmitted by antenna virtualization. Data symbols are usually precoded by beams with narrow width to reduce interference to unintended UEs. As a result, CQI may not match the SNR of the data channel due to the precoding difference. That is, the precoding of a data channel is different from the precoding of a control channel, consequently, the antenna-virtualization-based-CQI may not match the SNR or the data channel. In FD-MIMO systems, a mismatch between the CQI and SNR can be significant, because the precoding for data symbols has a much narrower beamwidth due to the large number of antennas in the array. As a solution, the eNB 401 performs CQI prediction by estimating the SNR for data channels based on the feedback CQI (or CQI fed back from a UE).

FIG. 5 illustrates a 3GPP LTE physical layer processing architecture according to the present disclosure. REF6 specifies the physical layer processing architecture in FIG. 5. The 3GPP LTE physical layer processing architecture 501 receives multiple codewords 505a-b and outputs an OFDM signal for each received codeword. The input of the processing chain in FIG. 5 is up to two codewords, wherein each codeword includes a sequence of bits. The bits in each codeword are scrambled and modulated by processing through "scrambling" and "modulation mapper" blocks. The scrambling unit 510a scrambles the codeword 505a and outputs a scrambled codeword. The modulation mapper 515a receives the scrambled codeword output from the scrambling unit 510a and modulates the scrambled codeword. The scrambling unit 510b and the modulation mapper 515b perform the same functions on the codeword 505b as elements 510a and 515a perform on codeword 505a. The layer mapper 520 receives the modulated scrambled codeword from the modulation mappers 515a and 515b and generates multiple layers 525. More particularly, the modulation symbols of the two codewords process through a layer mapper generating a number of layers (K). Each layer of the K number of layers is output to the precoding unit 530 that generates a number of precoded signals (N). Each of the N precoded signals corresponds to a respective resource element mapper 535a,b and a respective OFDM signal generation unit 540a,b. The K number of precoded signals are fed into their respective resource element mapper and OFDM signal generation blocks to output a number of antenna port signals (N). More particularly, each resource element mapper 535a,b receives and maps the precoded layer to resource elements of a resource block. Each OFDM signal generation unit 540a and 540b outputs an OFDM signal to the antenna ports 545.

In 3GPP LTE downlink, there are three different types of antenna ports, including cell-specific reference signal (CRS) antenna ports, channel-state-information reference signal (CSI-RS) antenna ports, and UE-specific reference signal (UE-RS) antenna ports. For CRS antenna ports, N=1, 2 or 4. For CSI-RS antenna ports, N=1, 2, 4 or 8. For UE-RS antenna ports, N=1, 2, 3, . . . , 8.

Figure 6:
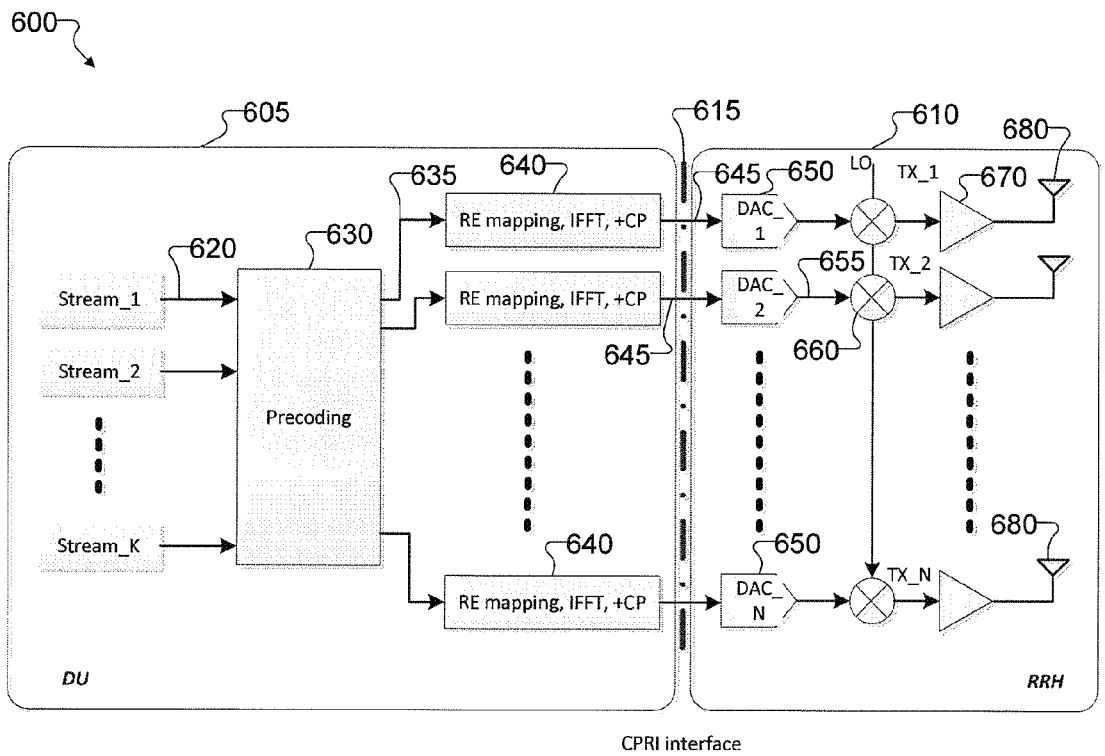
FIGS. 6 and 7 illustrate examples of architecture of a FD-MIMO base station according to the present disclosure.
Figure 7:
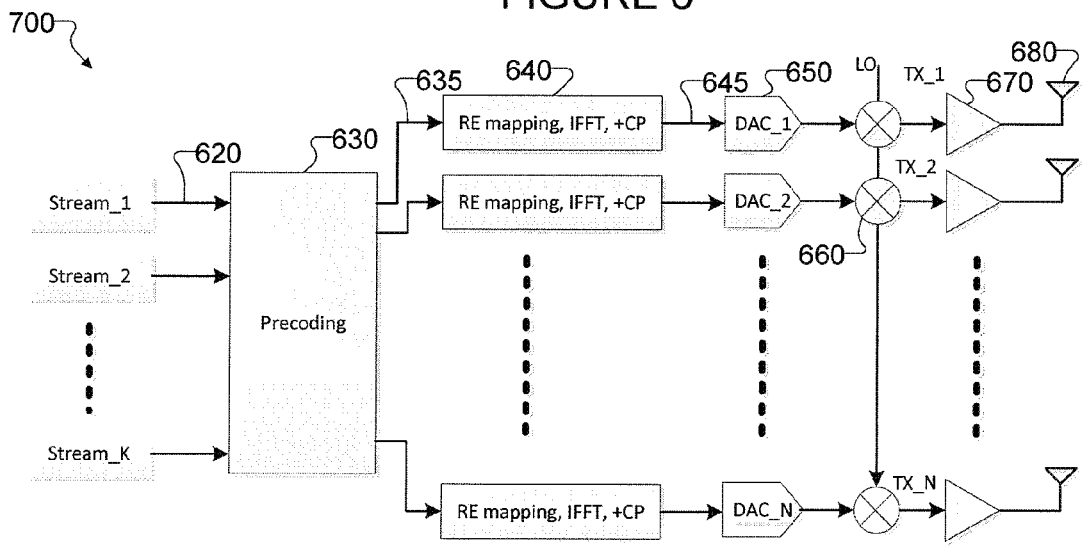

FIGS. 6 and 7 illustrate examples of architecture of a FD-MIMO base station according to the present disclosure. FIG. 6 illustrates architecture of a FD-MIMO base station using a CPRI interface. FIG. 7 illustrates architecture of another FD-MIMO base station, which is an integrated base station in which the modem and RF unit are integrated. The embodiments of the FD-MIMO base station architecture 600 and 700 shown in FIGS. 6 and 7 are for illustration only. Other embodiments could be used without departing from the scope of the present disclosure.

To support a large number of antenna ports, the overall system complexity increases. The complexity of precoding of multiple streams, OFDM modulation and interface between baseband and RF unit, increases proportionally to the number of antennas in the system. The complexity makes the system cost prohibitive to support large number of antenna ports.

In the example shown in FIG. 6, the FD-MIMO base station architecture 600 includes a data unit (DU) 605 and a remote radio head (RRH) 610 coupled to each other by a CPRI interface 615. In certain embodiments, the DU 605 is located at the bottom of the tower, the RRH 610 is located at the top of the tower, and the CPRI 615 runs from the top to the bottom of the tower to connect the DU 605 to the RRH 610. In certain embodiments, the DU 605 is located several kilometers away from the RRH 610, and the CPRI 615 runs from the RRH 610 at the top of the tower to connect to the DU 605. The DU 605 processes K streams (or layers) of baseband signals 620. The baseband signals 620 can be from multiple users or from multiple layers in MIMO configuration. The DU 605 includes a precoding block 630 and N IFFTs 640. The precoding block 630 performs frequency domain beamforming in the frequency domain to combat multipath fading for K streams by using N antenna ports. Examples of frequency domain beamforming include frequency selective beamforming, frequency dependent beamforming, and narrow band precoding. In various embodiments, the frequency precoding can vary across frequencies (frequency selective) or remain the same for the entire assigned bandwidth (frequency flat or wideband). More particularly, the precoding block 630 receives K baseband signals from K streams and outputs N frequency domain signals 635. The IFFTs 640 convert frequency domain signals 635 to time domain signals 645. Each IFFT 640 performs resource element mapping and adds a cyclical prefix (CP) to the time domain signal 645 outputted from the DU 605. The CPRI interface 615 carries the time domain signals 645 with CP to the RRH 610 for downlink transmission. The CPRI interface 615 includes a high speed fiber interface that carries baseband signals.

The RRH 610 processes N time domain signals 645 for N discrete transmission paths. More particularly, the RRH 610 outputs N beams. The RRU 610 includes N digital-to-analog converters (DAC) 650, N radio frequency (RF) chains 660, and N power amplifiers 670 and N antennas 680. The DAC 650 converts a digital time domain signal 645 into an analog RF signal 655. The each RF chain 660 outputs a signal to a corresponding power amplifier 670 and antenna port for the corresponding antenna 680.

The architecture 700 of a FD-MIMO base station is similar to the architecture 600 of a FD-MIMO base station. The architecture 700 of the FD-MIMO base station does not include a CPRI interface 615. For example, the IFFTs 640 output the time domain signals 645 directly into the DAC 650. In certain embodiments, the components of the architecture 700 of the FD-MIMO base station are disposed in close proximity to each other and are not separated by a tower height.

In FIGS. 6 and 7, the complexity of each system architecture 600 and 700 is measured according to Equations 1-3, where N is the number of antenna ports, K is the number of steams, L is the number of data resource elements, and G is the number of guard resource elements. In Equation 1, precoding includes matrix multiplication of (N×K) and (K×L). Equation 2 relates to the IFFT. Equation 3 relates to data traffic through the CPRI interface or other digital interface. The complexity of precoding, IFFT, and data traffic going through CPRI interface is proportional to the number of antenna ports N. When N is large, the system is cost prohibitive.

$$\text{Complexity}=O(N{\times}K{\times}L) \quad (1)$$

$$\text{Complexity}=O((L+G){\times}\log_2(L+G){\times}N) \quad (2)$$

$$\text{Complexity}=N{\times}(L+G) \text{ samples per OFDM symbol} \quad (3)$$

Figure 8A:
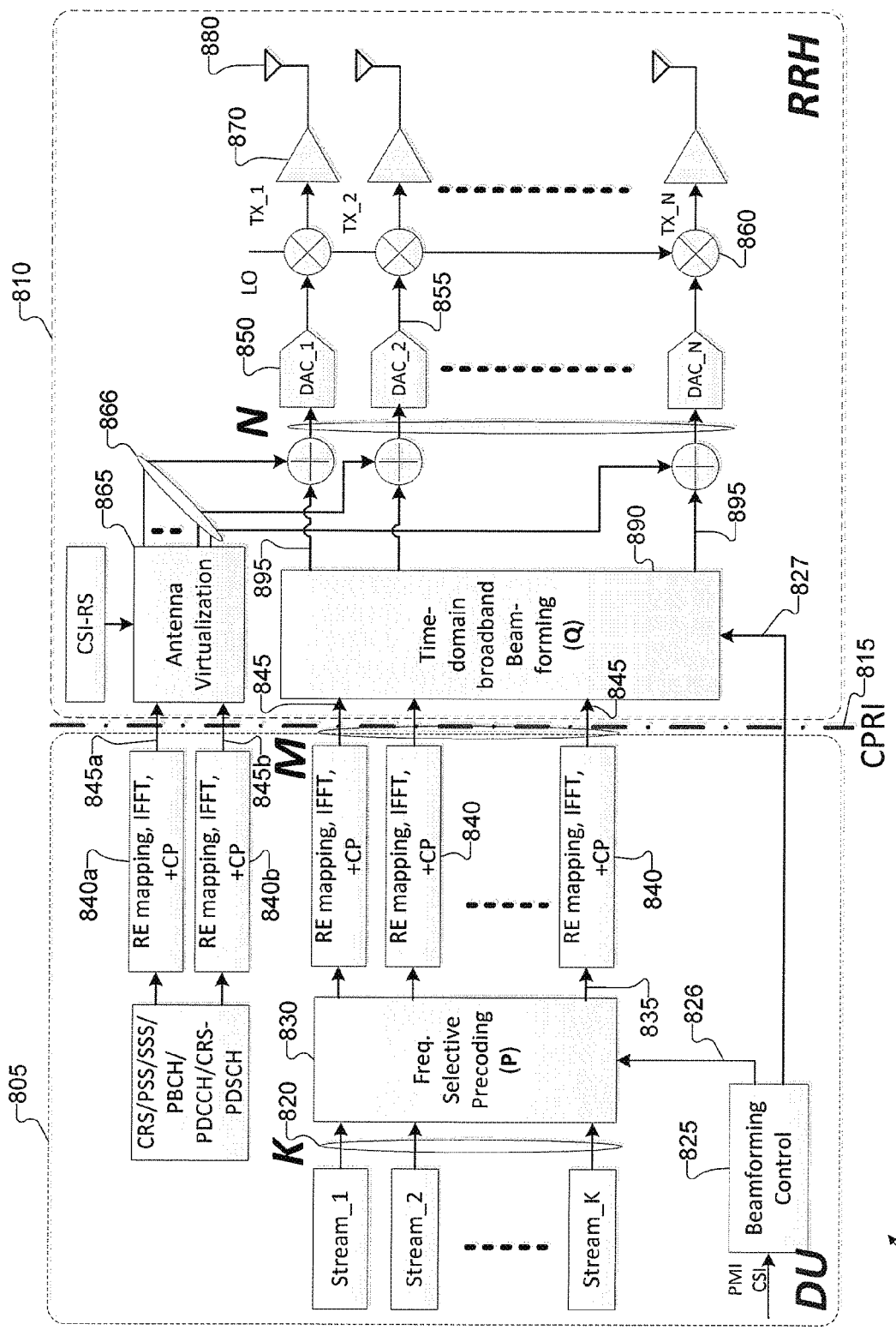
FIGS. 8A, 8B, 9, and 10 illustrate examples of a multistage beamforming architecture for a multiple antenna wireless communication system according to embodiments of the present disclosure.
Figure 8B:
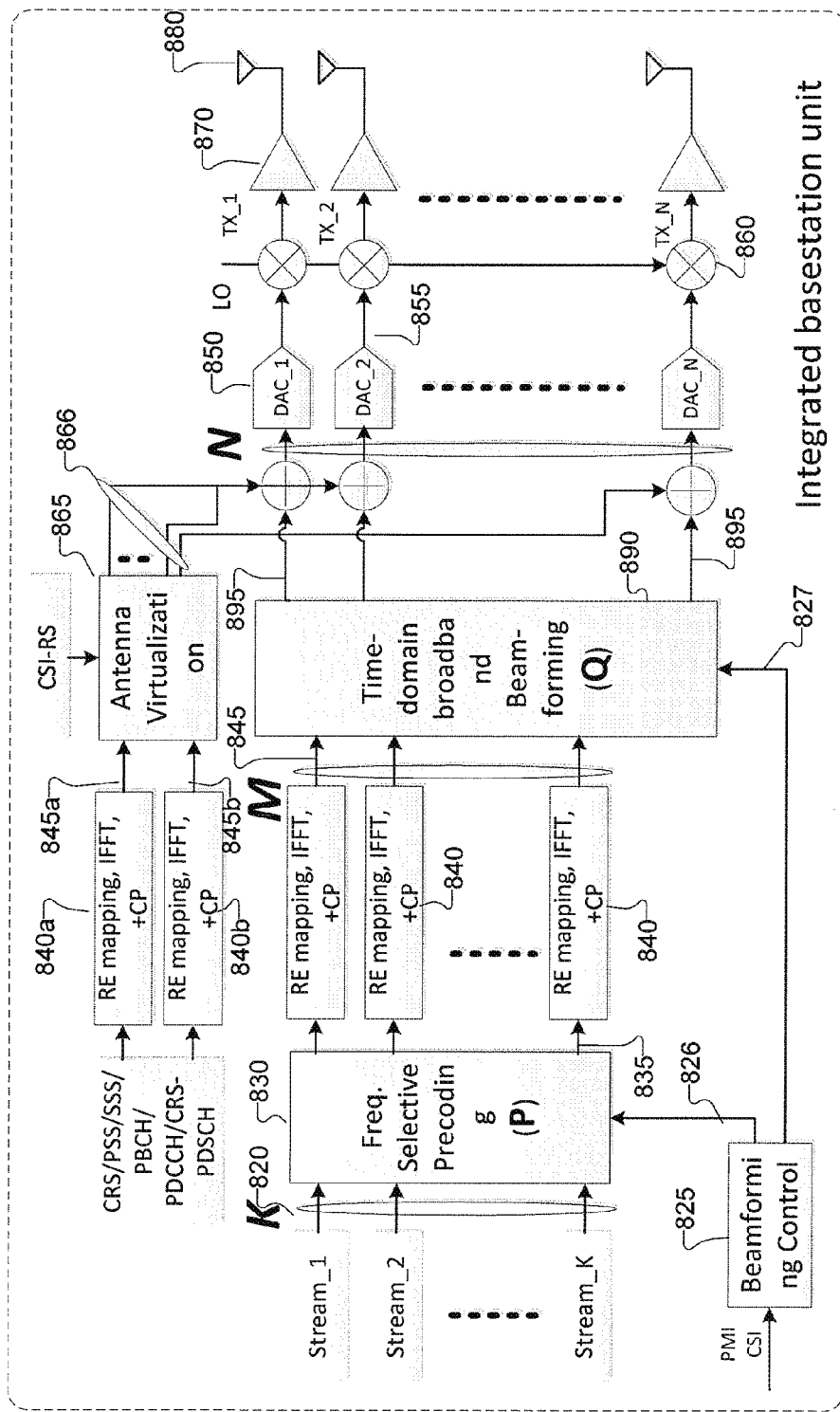
Figure 9:
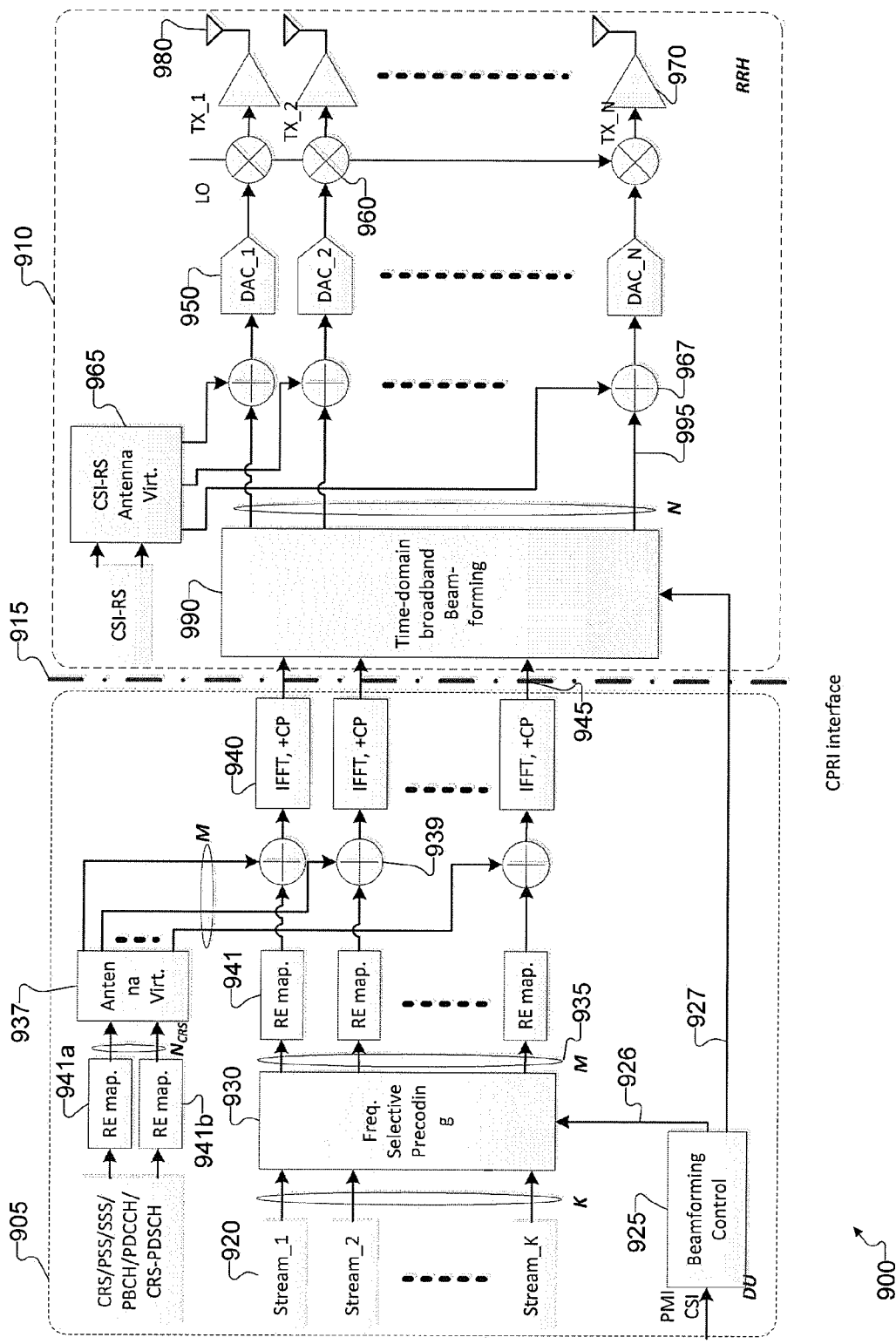
Figure 10:
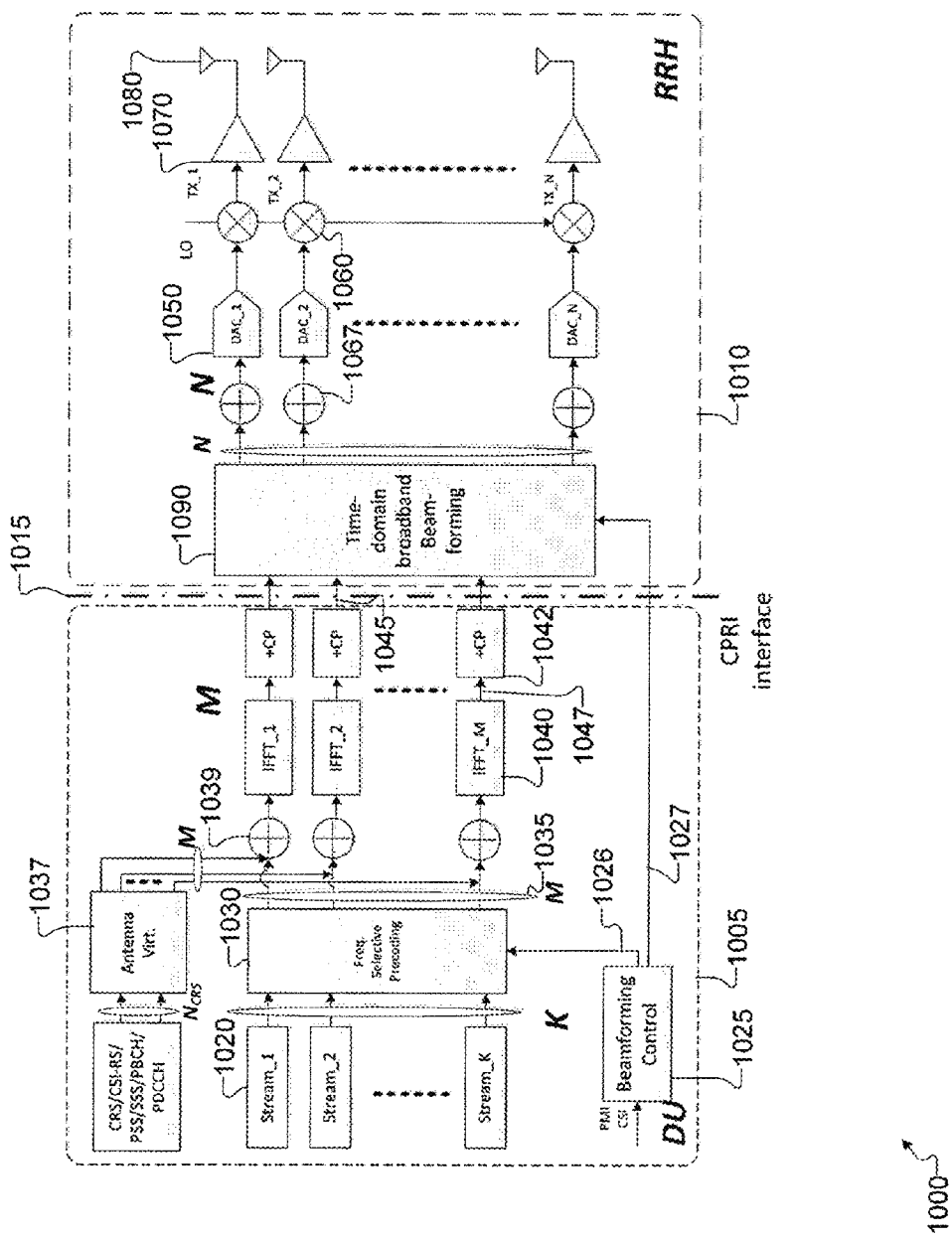

FIGS. 8A, 8B, 9, and 10 illustrate examples of a multistage beamforming architecture for a multiple antenna wireless communication system according to embodiments of the present disclosure. Each of the multistage beamforming architectures in FIGS. 8A-10 includes a frequency-domain stage that simultaneously forms M independent precoding output streams by converting K received data streams (layers) from the frequency domain to the time-domain, where K is less than or equal to M. Also, each of the multistage beamforming architectures in FIGS. 8A-10 includes a time-domain stage that simultaneously transmits signals from N transmitter RF chains by converting M received independent precoding output streams, where N is greater than M. FIG. 8A illustrates an example of a multistage beamforming for a multiple-antenna wireless communication system including antenna virtualization for common control signals and CSI-RS in the time-domain stage. FIG. 8B illustrates an integrated base station unit including an example of a multistage beamforming for a multiple-antenna wireless communication system including antenna virtualization for common control signals and CSI-RS in the time-domain stage. FIG. 9 illustrates another example of a multistage beamforming for a multiple-antenna wireless communication system including antenna virtualization for common control signals in the frequency domain stage and antenna virtualization for CSI-RS in the time-domain stage. FIG. 10 illustrates an example of a multistage beamforming for a multiple-antenna wireless communication system including antenna virtualization for common control signals and CSI-RS in the frequency-domain stage. The multistage beamforming architecture for a multiple antenna wireless communication system includes at least two stages of beamforming. The embodiments of the architectures 800, 801, 900, and 1000 shown in FIGS. 8A, 8B, 9, and 10 are for illustration only. Other embodiments could be used without departing from the scope of the present disclosure.

For example, each of the multistage beamforming architectures in FIGS. 8A-10 can be implemented in a macro base station including a CPRI interface that connects the frequency-domain stage to the time-domain stage. As another example, each of the multistage beamforming architectures in FIGS. 8A-10 can be implemented in an integrated base station, where data unit and antenna unit are combined in one unit, including the frequency-domain stage integrated with the time-domain stage to form a single system that does not include a CPRI interface. The multistage beamforming architectures in FIGS. 8A-10 can be implemented in an FD-MIMO base station.

FIG. 8A shows a two-stage beamforming (precoding) for a cellular downlink system. In the multistage beamforming architecture 800, CRS, CSI-RS and corresponding channels of PBCH, PDCCH, PSS/SSS, and CRS-based PDSCH are multiplexed in the time domain after virtualization. In FIG. 8A, the multistage beamforming architecture 800 includes a data unit (DU) 805 and a remote radio head (RRH) 810 coupled to each other by a CPRI interface 815. In certain embodiments, the DU 805 is located at the bottom of the tower, the RRH 810 is located at the top of the tower, and the CPRI 815 runs from the top to the bottom of the tower to connect the DU 805 to the RRH 810. In certain embodiments, the DU 805 is located several kilometers away from the RRH 810, and the CPRI 815 runs from the RRH 810 at the top of the tower to connect to the DU 805. The DU 805 performs a stage of the beamforming and the RRH 810 performs another stage of the beamforming.

For example, the DU 805 implements the first stage is a frequency selective beamforming stage, in which K data streams (layers) are precoded by frequency-selective precoding matrices. Also in the first stage, frequency domain samples are converted to the time domain. The second stage is a time-domain broadband beamforming stage, in which a second stage beamforming module (namely, the RRH 810) processes M time domain signals. In the second stage, an antenna virtualization module 865 maps common signals (for example, Cell-specific Reference Signals (CRS), CSI-RS, Physical Downlink Control Channel (PDCCH), Physical Broadcast Channel (PBCH), and PSS/SSS) and CRS-PDSCH into a beam pattern (for example, a broad beam pattern, or a narrow beam pattern) so that the common signals can be used to cover the cell. These common signals and CRS-PDSCH are added into the N beamformed time domain data signals.

The DU 805 includes a beamforming control block 825, a precoding block 830, a number M of IFFTs 840, a common signals IFFT 840a and 840b. The beamforming control block 825 generates beamforming control signals 826-827 based on uplink precoding matrix indicator (PMI) and/or a channel-state-information reference signal (CSI-RS) received from a UE or multiple UEs. The beamforming control block 825 sends the control signal 826 to the precoding block 830 and sends the other control signal 827 to the RRH 810. The beamforming control signal 826 indicates to the frequency domain precoding block 830 the frequency-selective precoding matrices to be applied to the K data streams 820. The beamforming control signal 827 indicates to the time-domain broadband beamforming block 890 the wide-band precoding matrix Q, or a set of indicators can be used to reconstruct Q, to be applied to the M streams 845 inputted to the time-domain broadband beamforming block 890. More particularly, the CPRI 815 carries the beamforming control signal 827 from the DU 805 to the RRH 810. The wide-band precoding matrix Q is described more particularly below in reference to FIG. 12.

The frequency selective precoding block 830 receives K streams (layers) 820 of user data, either from K unique users or any combination of multiple layers for multiple users. Each stream includes at least one user-equipment reference signal (UE-RS) combined with the user data. For example, a stream (Stream_1) can include a UE-RS from a first UE 411 combined with a data signal from the first UE 411. The data signal from the first UE 411 is associated with the UE-RS. The frequency domain precoding block 830 transforms the K data streams 820 into M independent precoding output streams 832 by applying frequency selective precoding matrices such as $\{P_f; f=0, 1, \ldots, F\}$, where subscript f refers to a subband index where the system bandwidth is partitioned into F subbands.

The M IFFT blocks 840 map the M streams 832 to resource elements in the frequency domain. More particularly, an IFFT block 840 is configured to map a respective one of the M precoding output streams to multiple user equipments according to a resource element mapping and transforms the M streams 820 into time domain signals through M inverse discrete Fourier transformations (IFFT). The IFFT block 840 adds a cyclical prefix (CP) to a respective precoded stream as a guard interval. More particularly the IFFT block 840 receives M independent precoded frequency-domain signals 835 and outputs M streams 845 of time domain samples to the RRH 810 through the CPRI interface 815. The M streams 845 of time domain samples are also referred to as OFDM time-domain signals. The interface between data unit and the remote radio head carries M streams of time domain signals.

The common signals IFFT 840a and 840b receives common signals such as CRS, PSS/SSS, PBCH, PDCCH, and CRS-PDSCH. Similar to the IFFT block 840, the common signals IFFT 840a maps the common signals to resource elements, converts the received common signals to streams 845a-b of time-domain signals. That is, the common signals (CRS, PSS/SSS, PBCH, PDCCH) and CRS-PDSCH are mapped to resource elements and converted to $N_{CRS}$ (shown in FIG. 8A as $N_{CRS}$=2) streams 845a-b of time domain signals. The $N_{CRS}$ streams 845a-b are carried separately through the CPRI interface and then virtualized using broad beam phase shifters. In certain embodiments, the IFFTs 840a and 840b are identical to the IFFTs 840.

Figure 12:
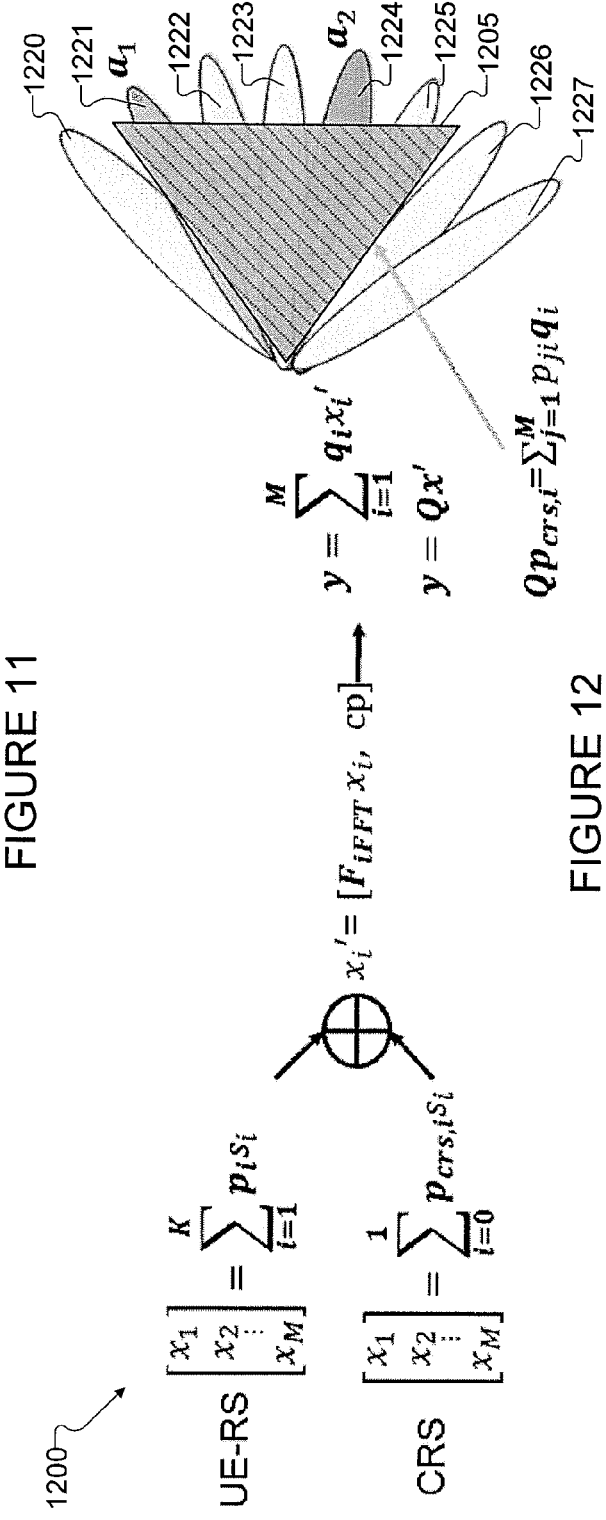
FIG. 12 illustrates a control signal virtualization and multiplexing method according to embodiments of the present disclosure.

The RRH 810 includes N digital-to-analog converters (DAC) 850, N radio frequency (RF) chains 860, an antenna virtualization module 865, and N power amplifiers 870, multiple antennas 880, and a time-domain broadband beamforming block 890. That is, the RRH 810 includes N transmit streams, and each transmit stream includes one DAC 850, one RF chain 860, and one power amplifier 870. Each transmit stream (also referred to as "transmitter chain" or "transmitter RF chain") is connected to at least one physical antenna. As a result, the number of physical antennas 880 in the RRH 810 can be equal to the number N of transmit streams. A single transmit stream can be connected to multiple physical antennas, and in this embodiment, the number of physical antennas 880 in the RRH 810 can be greater than the number N of transmit streams. The DAC 850 converts a digital time domain signal 845 into an analog RF signal 855. The each RF chain 860 outputs a signal to a corresponding power amplifier 870 and corresponding physical antenna 880. Each of the physical antennas 880 simultaneously transmits signals, which in the air, together, form a broadcast wide beam of control channel information and a plurality of user-specific downlink narrow beams of data information. The right hand side of FIG. 12 shows theses simultaneously transmitted multiple user-specific data narrow-width beams together with a control broadcast wide beam.

As input, the time-domain broadband beamforming block 890 receives the time domain samples 845 from the CPRI 815 and the beamforming control signal 827 from the beamforming control block 825. The time-domain broadband beamforming block 890 uses digital phase shifters (for example, multipliers or multiplier-less CORDIC functions) to form N streams of time-domain samples 845, where N is the number of independent RF chains. The time-domain broadband beamforming block 890 multiplies a wide-band precoding matrix Q by M input signals 845 and generates N precoded output signals 895. The time-domain broadband beamforming block 890 determines the wide-band precoding matrix Q based on the beamforming control signal 827. In certain embodiments, the time-domain broadband beamforming block 890 stores multiple wide-band precoding matricies Q, each stored wide-band precoding matrix Q corresponding to an index. In response to receiving a beamforming control signal 827 indicating an index, the time-domain broadband beamforming block 890 selects to precode using the wide-band precoding matrix Q corresponding to the received index. In certain embodiments, the time-domain broadband beamforming block 890 is configured to receive a beamforming control signal 827 that includes a selected wide-band precoding matrix Q, and to precode using the received wide-band precoding matrix Q. In certain embodiments, in response to receiving a beamforming control signal 827 that includes a set of indicators for reconstructing a wide-band precoding matrix Q, the time-domain broadband beamforming block 890 reconstructs the wide-band precoding matrix Q using the set of indicators, and precodes using the reconstructed wide-band precoding matrix Q.

A base station can determine the frequency-domain precoding matrices $\{P_f: f=0, 1, \ldots, F\}$ and the wide-band precoding matrix Q based upon a precoding matrix indicator (PMI) feedback, or uplink sounding. For example, the beamforming control block 825 sets up the precoding matrices, $\{P_f: f=0, 1, \ldots, F\}$ and Q. When the base station selects to apply MU-MIMO precoding of $\{W_f: f=0, 1, \ldots, F\}$, the base station determines $\{P_f: f=0, 1, \ldots, F\}$ and Q that satisfying the condition of: $W_f=QP_f$ for each subband f. More particularly, the frequency selective precoding block 830 determines the precoding matrices $\{P_f: f=0, 1, \ldots, F\}$ based on the control signal 826, and the time-domain broadband beamforming block 890 determines the wideband precoding matrix Q based on the control signal 827.

The RRH 810 generates a number $N_{CSI-RS}$ of time-domain channel state information reference signals (CSI-RS), wherein the sequence of resource element mapping of the CSI-RS can be configured by either the DU 805 or the RRH 810. The antenna virtualization module 865 receives the $N_{CSI-RS}$ of time-domain CSI-RS signals.

The RRH 810 constructs a time-domain CSI-RS by first generating CSI-RS sequences, next mapping the CSI-RS sequences to resource elements in the frequency domain, and then applying OFDM signal generation (IFFT, +CP). Finally, the antenna virtualization module 865 applies a CSI-RS specific antenna virtualization precoding to the $N_{CSI-RS}$ time-domain CSI-RS signals to generate N virtualized CSI-RS signals. The antenna virtualization module 865, by applying the CSI-RS specific antenna virtualization precoding, can generate wide beamwidth CSI-RS, narrow beamwidth CSI-RS, or a mixture of wide and narrow beamwidth CSI-RS. That is, the N virtualized CSI-RS signals can include wide, narrow, or both of wide and narrow beamwidth virtualized CSI-RS signals. The N virtualized CSI-RS signals are added to the N output data signals 895 to form N combined signals. The combined signals are then processed through the DACs 850, RF chains 860, and the power amplifier 870, and transmitted over the air by the antennas 880.

To support a broad beamwidth of the common control signals (such as PBCH, CRS, PDCCH, PSS and SSS), the DU 805 stage includes a separate path to convert the common control signals to time domain. Certain embodiments of the DU 805 include a number $N_{CRS}$ of CRS ports, for example, more than one CRS port. For example, two CRS ports are used in the DU 805 of FIG. 8A. The CPRI 815 carries the time domain signals 845a-b of the common control signals to RRH 810. An antenna virtualization module 865 maps the two streams 845a-b for N transmit streams. That is, the antenna virtualization module 865 receives and applies a common control signals specific antenna virtualization precoding to the $N_{CRS}$ time domain common control signals 845a-b in order to generate N virtualized common control signals. The antenna virtualization module 865, by applying the common control signals specific antenna virtualization precoding, can generate wide beamwidth CRS and wide beamwidth common control channels associated with CRS. The N virtualized common control signals include wide beamwidth CRS and wide beamwidth common control channels associated with CRS. More particularly, the antenna virtualization module 865 outputs N virtualized control signals 866 including the N virtualized common control signals combined with the N virtualized CSI-RS signals. The virtualized control signals 866 are added to the output data signals 895 and the combined signals are transmitted on N transmitter chains.

The multistage beamforming architectures 800, 900, and 1000, each provides comparable system performance compared to the FD-MIMO base station architectures 600 or 700. As an example, in the single stream case of K=1, the transmitted signal samples are grouped into blocks of size $N_c$. Specifically, with no loss of generality, consider a block of size $N_c$ as follows: $s=[s_1\ s_2\ \ldots\ s_{Nc}]$, where s is the data stream.

The data stream 820 of size $N_c$ passes through a M×1 frequency-selective precoder 830 $w_i$, where $w_{im}$ is the mth entry of the precoding vector $w_i$ (i.e., $w_i = [w_{i1}\ w_{i2}\ \ldots\ w_{iM}]^T$. The output of the precoder 830 is $X := [w_1 s_1\ w_2 s_2 \ldots w_{Nc} s_{Nc}]$ which has dimensionality of M×$N_c$. The mth row of the matrix X is defined as $x_m = X(m,:)$. After serial to parallel conversion, the input of the mth inverse fast Fourier transform (IFFT) operation is the vector $x_m^T$. The output of the IFFT operation is given by $F^H x_m^T$ for m=1, ..., M, where F denotes the discrete Fourier transform (DFT) matrix of size $N_c$ and H denotes the Hermitian of a matrix. The ith entry of the column vector $t_m$ is defined as $t_m = F^H x_m^T$ and $t_{mi}$. Define $c_i = [t_{1i}\ t_{2i}\ \ldots\ t_{Mi}]^T$. For each time instant i, the vector c is precoded by a N×M time domain precoding matrix Q and the output of the time-domain precoder is given by $Qc_i$, which is a N×1 column vector. Define $p_{ni} = Q(n,:)c_i$ and $p_n = [p_{n1}\ p_{n2} \ldots p_{nNc}]^T$. Appended by a cyclic prefix (CP), the sequence of the data stream $\{p_{ni}\}$ is transmitted over the nth transmit antenna. Mathematically, after the CP insertion, the transmitted block can be written as $T_{cp} p_n = [I_{cp}^T I_{Nc}^T]^T p_n$, and then is transmitted over a (L+1) tap multipath channel $h_n = [h_n(0) \ldots h_n(L)]$ after a serial-to-parallel conversion. At the receiver end, the CP is first removed and accordingly the received signals $y_n$ from the $n^{th}$ transmit antenna can be written as $y_n = \overline{H}_n p_n$ where $\overline{H}_n$ is a $N_c \times N_c$ circulant matrix and the (k,l)th entry given by $h_n((k-1) \bmod N_c)$. By definition, the vector $p_n$ can be rewritten as Equation 4

$$p_n = \begin{bmatrix} q_1^T \\ q_2^T \\ \vdots \\ q_{Nc}^T \end{bmatrix} Q^T(n,:) \qquad (4)$$

$$= [t_1\ t_2\ \ldots\ t_M] Q^T(n,:)$$

$$= F^H [x_1^T\ x_2^T\ \ldots\ x_M^T] Q^T(n,:)$$

At the receiver, the output of the FFT matrix is given by Equation 5:

$$y = F \sum_{n=1}^{N} y_n \qquad (5)$$

$$= \sum_{n=1}^{N} FH_n F^H [x_1^T\ x_2^T\ \ldots\ x_M^T] Q^T(n,:)$$

$$= \sum_{n=1}^{N} \Lambda_n \sum_{m=1}^{M} q_{nm} x_m^T$$

$$= \sum_{n=1}^{N} \Lambda_n \sum_{m=1}^{M} q_{nm} x_m^T$$

where $\Lambda_n$ is a $N_c \times N_c$ diagonal matrix with diagonal entries $$H_n(i) := \sum_{l=0}^{L} h_n(l) e^{j2\pi i l / N_c}$$

for i=1, ..., $N_c$. At subcarrier i, the received signal $y_i$ is given by Equation 6:

$$y_i = [H_1(i)\ H_2(i)\ \ldots\ H_N(i)] Q w_i s_i. \qquad (6)$$

An example choice for the wide-band beamforming matrix Q is $$Q = \begin{bmatrix} e^{j\theta_{11}} & e^{j\theta_{12}} & \ldots & e^{j\theta_{1M}} \\ e^{j\theta_{21}} & e^{j\theta_{22}} & \ldots & e^{j\theta_{2M}} \\ \vdots & \vdots & \vdots & \vdots \\ e^{j\theta_{N1}} & e^{j\theta_{N2}} & \ldots & e^{j\theta_{NM}} \end{bmatrix}.$$

An appropriate design of the precoding vector $w_i$ is needed to ensure the constant modulus property of the overall precoder. In this case, all elements in the Q matrix are digital phase shifter. These digital phase shifters can be implemented by complex multiplication arithmetic unit, or by using low complexity rotation logic, for example, in multiplier-less CORDIC functions.

As described above, the eNB according to embodiments of the present disclosure performs CQI prediction, for example, the beamforming control block 825 can implement CQI prediction. The eNB 401 implements link-adaptation methods to predict downlink signal-to-interference-plus-noise ratio (SINR) (also referred to as the signal-to-noise-plus-interference ratio (SNIR)) or channel quality information estimated at the transmitter (Tx CQI) to be used by the eNB 401 in performing modulation and coding scheme (MCS) selection. The eNB 401 implements the link-adaptation methods by using uplink sounding reference signals (SRS) and feedback CQI for the Tx CQI prediction.

As an example, the eNB implements a Tx CQI prediction method for single-user MIMO (SU-MIMO) for a UE having a single transmit antenna (1-Tx antenna UE). Tx CQI prediction can also be referred to as downlink SINR prediction. In the case of 1-Tx antenna UE, Tx CQI prediction method, the $UE_k$, having a UE index k, receives downlink signals ($y_k$) with antenna virtualization ($w_0$). The downlink signals that the $UE_k$ receives can be expressed by the following equation:

$$y_k = h_k w_0 s_0 + n_k, \text{ for } k=1, \ldots, K \qquad (4)$$

where $h_k$ is the channel direction vector for $UE_k$, which is estimated at the eNB utilizing SRS transmitted by the UE's single transmit antenna. Also, $s_0$ is a transmission symbol, and $n_k$ is noise at the $UE_k$ receiver. The $UE_k$ feeds back a feedback CQI ($\rho_{0k}$) to the eNB, and in this example, the feedback CQI ($\rho_{0k}$) is equal to the corresponding SINR estimated at the 1-Tx antenna UE, as expressed by the equation (5) below.

$$\rho_{0k} = \frac{|h_k w_0|^2}{\sigma_k^2} \qquad (5)$$

where $\sigma_k^2$ is the receiver noise variance, which is unknown to the eNB. When the UE-specific precoder $w_k$ is applied in place of the antenna virtualization procoder ($w_0$), the downlink Tx SINR $\rho_k$ for data symbols is expressed according to equation (6) below.

$$\rho_k = \frac{|h_k w_k|^2}{\sigma_k^2} \qquad (6)$$

As the eNB is aware of the channel direction vector $h_k$ via SRS channel estimates, the eNB can obtain SINR for data channels (or Tx CQI) according to the relationship expressed in equation (7):

$$\rho_k = \frac{|h_k w_k|^2}{|h_k w_0|^2} \rho_{0k} \qquad (7)$$

where $\rho_{0k}$ is feedback CQI, $w_0$ is the antenna virtualization precoder; and $w_k$ is the UE-specific precoder $w_k$. Once the eNB obtains the Tx CQI, the eNB can use the Tx CQI for link adaptation, for example, for determining MCS for the UE. Accordingly, the Tx CQI prediction method for SU-MIMO for 1-Tx antenna UE works well, achieving 10% normalized prediction error if there is no MU-MIMO transmission. In case of MU-MIMO, the CQI prediction is more difficult.

As another example, the eNB implements a Tx CQI prediction method for multiple-user MIMO (MU-MIMO) for a 1-Tx antenna UE with one CQI and one SRS. In this example, the eNB implements a method of predicting SINRs for MU-MIMO transmissions, in which a single layer of information is transmitted per UE, when a UE transmits a single SRS and feeds back one CQI. In this example, the Tx CQI prediction method includes: mapping the CQI into SINR ($\rho_0$) based on a certain or specified mapping; obtaining channel estimate based on one SRS, wherein the downlink SNR is different from uplink SNR estimated using SRS; and reconstructing SINR or MU-CQI based on an SRS channel estimation. More particularly, in this example, the SRS can be expressed by equation (8):

$$SRS = \mu_1 h_1 \qquad (8)$$

where $h_l$ for one transmit antenna and for $N_r$ receive antennas is the $1 \times N_r$ normalized channel direction vector, and $\mu_l$ is the power associated with this channel for $UE_l$, namely a UE having a UE index of l. CQI mismatch causes the downlink channel SNR or downlink channel power to be different from the uplink SNR estimated with SRS. Also in this example, the eNB reconstructs or recalculates the SINR or MU-CQI based on the SRS channel estimation.

In the example wherein the eNB implements a Tx CQI prediction method for multiple-user MIMO (MU-MIMO) for a 1-Tx antenna UE with one CQI and one SRS, at the receiver of the $UE_l$, the multiple user SINR can be predicted using equation (9) below:

$$SINR_{l,MU} = \frac{P|h_l w_l|^2}{L\sigma_l^2 + \sum_{i \in M-l} |h_l w_i|^2} \qquad (9)$$

In equation (#), M represents the set of the co-scheduled UEs with cardinality L, P represents the total transmitted power at eNodeB, $\sigma_l^2$ represents noise power at $UE_l$, and $w_l$ represents the precoding vector for the $l^{th}$ UE. In this example, the UE computes its SINR (CQI) and the basis that the eNB employs conjugate beamforming with the total transmitted power P. That is, the precoding vector of $UE_l$ is equal to $h_l^H$, where H represents a Hermitian operation. The UE computes the single user SINR (or feedback CQI) according to equation (10) below:

$$SINR_{l,SU} = \frac{P \|h_l\|^2}{\sigma_l^2} \qquad (10)$$

In the case of conjugate beamforming, the eNB implements a Tx CQI prediction method or MU-SINR prediction method for multiple-user MIMO (MU-MIMO) for a 1-Tx antenna UE with one CQI and one SRS. The eNB computes the MU-SINR using equation (11) below.

$$SINR_{l,MU} = \frac{SINR_{l,SU}}{SINR_{l,SU} \sum_{i \in M-l} \rho_{li}^2 + L} \qquad (11)$$

In equation (#), by definition, the correlation coefficient $\rho_{li}$ is expressed according to equation (12).

$$\rho_{li} = \left| \left\langle \frac{h_l}{\|h_l\|}, \frac{h_i}{\|h_i\|} \right\rangle \right| \qquad (12)$$

Once the eNB has calculated or obtained L Tx CQIs, one Tx CQI for each of the L MU-MIMO UEs, the eNB uses the Tx CQI for link adaptation, for example, for determining MCS for each UE participating in the MU-MIMO transmission.

As another example, the eNB implements a Tx CQI prediction method for single-user MIMO (SU-MIMO) for a UE having two transmit antennas (2-Tx antenna UE) with one CQI and two SRS. In this example, the eNB implements a method of predicting SINRs for SU-MIMO transmissions, in which the eNB transmits two layers of information to a UE when a 2-Tx antenna UE transmits two SRS and feeds back one CQI. In this example, the Tx CQI prediction method includes: mapping CQI into SINR $\rho_0$ based on a specified mapping; obtaining channel estimates based on the SRSs, wherein the downlink SNR or power is different from uplink SNR or power; reconstructing or recalculating the SINR or CQI based on an SRS channel estimation; and estimating downlink channel coefficient vectors by using channel estimates of SRS and the predicting CQI values. More particularly, in this example, the SRS of the two antennas can be expressed by equations (13) and (14):

$$SRS_1 = \mu_1 h_1 \qquad (13)$$

$$SRS_2 = \mu_2 h_2 \qquad (14)$$

where $h_i = [h_{1i}\ h_{2i}]$ (for 2 transmit antennas) or $h_i = [h_{1i}\ h_{2i}\ h_{3i}\ h_{4i}]$ represents the normalized channel direction vector, and $\mu_i$ represents the power associated with this channel, which is unknown in the obtaining step of the Tx CQI prediction method. CQI mismatch causes the downlink channel SNR or downlink channel power to be different from the uplink SNR.

In the example wherein the eNB implements a Tx CQI prediction method for SU-MIMO for a 2-Tx antenna UE with one CQI and two SRS, the eNB reconstructs the SINR by calculating the SINR per subcarrier per antenna using equations (15) and (16) below:

$$SINR_{rx(1)} = \frac{|h_{11}|^2 + |h_{21}|^2}{2 \times \text{int var}} \qquad (15)$$

$$SINR_{rx(2)} = \frac{|h_{12}|^2 + |h_{22}|^2}{2 \times \text{int var}} \quad (16)$$

In equations (15) and (16), the "int var" represents the estimate of interference plus noise power of a UE, and the interference may include inter-cell interference.

In the example wherein the eNB implements a Tx CQI prediction method for SU-MIMO for a 4-Tx antenna UE, the eNB reconstructs the SINR by calculating the SINR per subcarrier per antenna using equations (17), (18), and (19) below:

$$SINR_{rx(i),1} = \frac{|h_{1i}|^2 + |h_{2i}|^2}{2 \times \text{int var}} \quad (17)$$

$$SINR_{rx(i),2} = \frac{|h_{3i}|^2 + |h_{4i}|^2}{2 \times \text{int var}} \quad (18)$$

$$SINR_{rx(i)} = \text{Average}([SINR_{rx(i),1}, SINR_{rx(i),2}]) \quad (19)$$

In equations (17), (18), and (19), the Average( ) is a function to average SINRs across a total number of assigned resource elements. The averaged SINR is a single SINR value characterizing the frame error rate of a packet transmitted in the assigned resource elements. For example, the Average( ) can be an effective exponential SNR mapping (EESM) function, which by definition is defined according to equation (20) below.

$$EESM(X) = -\lambda \ln\left(\frac{1}{N} \sum_{l=1}^{N} e^{-X_l/\lambda}\right) \quad (20)$$

In equation (#), $X := [X_1, \ldots, X_N]$ and $\lambda$ represents a parameter related to MCS order. An example of an MCS order includes 2, 4 and 6 for QPSK, 16QAM and 64QAM respectively.

In the example wherein the eNB implements a Tx CQI prediction method for SU-MIMO for a 2-Tx antenna UE with one CQI and two SRS, the eNB reconstructs the SINR by calculating the SINR per subcarrier using equation (21) below:

$$SINR_{sc} = SINR_{rx(1)} + SINR_{rx(2)} \quad (21)$$

In the example wherein the eNB implements a Tx CQI prediction method for SU-MIMO for a 2-Tx antenna UE with one CQI and two SRS, the eNB reconstructs the SINR by obtaining the overall predicted SINR $\rho_1$ (Tx CQI) for each UE. Also, in this example, the eNB estimates downlink channel coefficient vectors using channel estimates of SRS and the predicted CQI values, where the predicted CQI values are expressed by a normalized channel vector h multiplied by a scaling factor μ. That is, the predicted CQI values are expressed as μh, where μ is the ratio of downlink power and uplink power, and where μ is calculated according to equation (22):

$$\mu = \sqrt{\frac{\rho_1}{\rho_0}} \quad (22)$$

FIG. 8B, the multistage beamforming architecture 801 includes components of the architecture 800 as implemented in an integrated base station unit.

FIG. 9 illustrates another example of multistage (for example, two-stage) beamforming architecture for multiple-antenna wireless communication system. In the multistage beamforming architecture 900, the number of CSI-RS ports can be different (for example, greater) than the number of CRS ports. The multistage beamforming architecture 900 multiplexes CSI-RS in the time domain, but to keep complexity low, CRS and corresponding channels of PBCH, PDCCH, PSS/SSS, and CRS-based PDSCH are multiplexed in the frequency domain. The multistage beamforming architecture 900 includes a data unit (DU) 905 and a remote radio head (RRH) 910 coupled to each other by a CPRI interface 915. The DU 905 includes a beamforming control block 925, a precoding block 930, a number M of resource element mappers 941, a number $N_{CRS}$ of resource element mappers (including a common signals resource element mapper 941a and a CRS-PDSCH resource element mapper 941b), a common signals antenna virtualization module 937, a number M of IFFTs 940. The DU 905 also includes a number M of adders 939, and each adder 939 adds one of the antenna virtualized common signals to a respective one of the RE mapped streams and outputs a combined signal to a respective IFFT 940. The beamforming control block 925 generates beamforming control signals 926-927 based on received PMI and/or CSI. The RRH 910 receives M time-domain signals 945 and the beamforming control signal 927 from the DU 805 and generates the CSI-RS signals. The RRH 910 includes N digital-to-analog converters (DAC) 950, N radio frequency (RF) chains 960, a CSI-RS antenna virtualization module 965, and N power amplifiers 970, N antennas 980, and a time-domain broadband beamforming block 990. The CSI-RS antenna virtualization module 965 maps the CSI-RS signals into a beam pattern so that the CSI-RS signal can be transmitted across the entire cell. The RRH 910 also includes a number N of adders 967, and each adder 967 adds one of the N antenna virtualized CSI-RS signals to a respective one of the N time-domain broadband beamformed streams 995 and outputs a combined signal to a respective DAC 950.

In certain embodiments, the resource element mappers 941a and 941b are identical to the resource element mappers 941. Also note that components 920, 925, 930, 935, 950, 960, 970, 980, and 990 in FIG. 9 could be the same as or similar to corresponding components 820, 825, 830, 835, 850, 860, 870, 880, and 890 in FIG. 8A. These components in FIG. 9 can operate in the same or similar manner as the corresponding components in FIG. 8A.

In FIG. 9, the common signals (for example, Cell-specific Reference Signals (CRS), CSI-RS, PDCCH, PBCH, and PSS/SSS) and CRS-PDSCH are multiplexed in the frequency domain, and by comparison, the CRS-PDSCH and common signals in FIG. 8A are mapped in the time domain. By multiplexing the common signals and CRS-PDSCH in the frequency domain (for example, in the DU 805), the multistage beamforming architecture 900 saves (or does not use) the two (or $N_{CRS}$) CPRI interfaces that the multistage beamforming architecture 800 uses for transmitting the common signals and CRS-PDSCH from the DU 805 to the RRH 810. More particularly, the multistage beamforming architecture 900 multiplexes the common signals and CRS-PDSCH in the frequency domain after the RE mapping 940 and OFDM signal generation blocks process the common signals and CRS-PDSCH. For example the CPRI 915 carries data traffic 945 from M IFFTs 940, yet the CPRI 815 carries data traffic 845 and common control channel information 845*a*-*b* from $N_{CRS}$+M IFFTs 840 and 840*a*-*b*.

The multistage beamforming architecture 900 provides several technical advantages. For example, the frequency domain processing is reduced; the number of IFFT blocks (for example, $N_{CRS}$ fewer IFFT blocks) is reduced; the data traffic between baseband unit (for example, DU) and RF unit (for example, RRH) is reduced; and the time domain beamforming operation can be implemented in a digital domain without using any RF phase shifters.

FIG. 10 illustrates an example of multistage (for example, two-stage) beamforming architecture for multiple-antenna wireless communication system. In the multistage beamforming architecture 1000, CRS, CSI-RS and corresponding channels of PBCH, PDCCH, PSS/SSS, and CRS-based PDSCH are multiplexed in the frequency domain after virtualization. That is, the multistage beamforming architecture 1000 reduces potential issues and complexity associated with insertion signals in the time domain. The multistage beamforming architecture 1000 includes a data unit (DU) 1005 and a remote radio head (RRH) 1010 coupled to each other by a CPRI interface 1015. The DU 1005 includes a beamforming control block 925, a frequency selective precoding block 1030, a number M of adders 1039, a common signals antenna virtualization module 1037, a number M of IFFTs 1040, and a number M of cyclic prefix modules 1042. Each adder 1039 adds one of the M antenna virtualized common signals to a respective one of the M frequency precoded streams and outputs a combined signal to a respective IFFT 1040. The IFFTs 1040 perform an IFFT process on the M combined signals and outputs a time-domain signals 1047 to the cyclic prefix module 1042. The cyclic prefix modules 1042 add a cyclic prefix to the time-domain signals 1047 and output a number M of OFDM time-domain signals 1045 to the time-domain broadband beamforming block 1090 through the CPRI interface 1015. The beamforming control block 1025 generates beamforming control signals 1026-1027 based on received PMI and/or CSI. The RRH 1010 receives M time-domain signals 1045 and the beamforming control signal 1027 from the DU 1005. In this example, the DU 1005 generates the CSI-RS signals that are inputted to the antenna virtualization module 1037. The RRH 1010 includes N digital-to-analog converters (DAC) 1050, N radio frequency (RF) chains 1060, a number N of adders 1067, and N power amplifiers 1070, N antennas 1080, and a time-domain broadband beamforming block 1090.

Note that components 1020, 1025, 1030, 1035, 1050, 1060, 1070, 1080, and 1090 in FIG. 10 could be the same as or similar to corresponding components 820, 825, 830, 835, 850, 860, 870, 880, and 890 in FIG. 8A. These components in FIG. 10 can operate in the same or similar manner as the corresponding components in FIG. 8A. Note that component 1037 in FIG. 10 could be the same as or similar to corresponding component 937 in FIG. 9. These components in FIG. 10 can operate in the same or similar manner as the corresponding components in FIG. 9.

Figure 11:
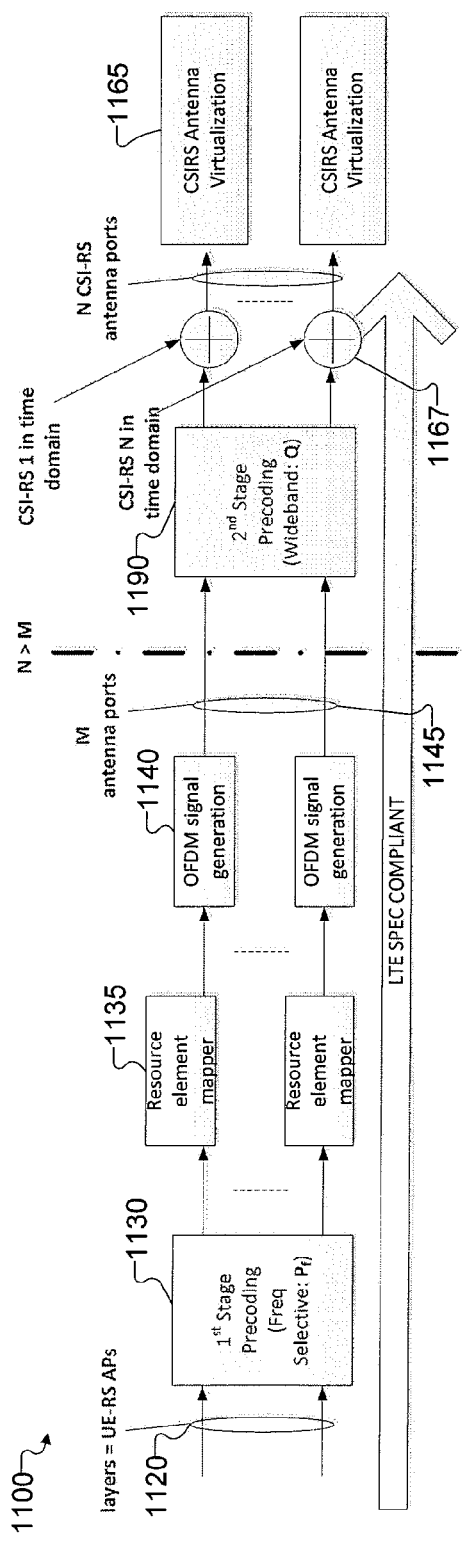
FIG. 11 illustrates a channel-state-information reference signal (CSI-RS) mapping scheme in a multistage beamforming system according to embodiments of the present disclosure.

FIG. 11 illustrates a CSI-RS mapping scheme in a multistage beamforming system according to embodiments of the present disclosure. The CSI-RS mapping scheme 1100 can be implemented where the first beamforming stage (such as DU 905) and second beamforming stage (such as RRH 910) are disposed in the same processing unit, as shown in the multistage beamforming architecture 900 of FIG. 9. The embodiment of the CSI-RS mapping scheme 1100 shown in FIG. 11 is for illustration only. Other embodiments could be used without departing from the scope of the present disclosure.

In frequency-division multiplexing systems (e.g., frequency-division duplexing (FDD) systems), the UE (for example, UE 411) feeds back PMI precoder at subband f: The eNB (for example, eNB 401) calculates the wide-band precoding matrix Q and frequency-domain precoding matrix $P_f$ such that $W_f = QP_f$ for each subband f. In CSI-RS mapping, the baseline is defined as one CSI-RS per CSI-RS AP. The alternative is defined by horizontal CSI RS mapping and vertical CSI RS mapping, which requires a number $N_V + N_H$ CSI-RS signals equal to the sum of the number of antennas ($N_V$) per column and the number ($N_H$) of antennas per row.

In time-division multiplexing systems (e.g., time-division duplexing (TDD) systems), the eNB (for example, eNB 401) determines $W_f$, and a single CSI-RS is sufficient.

As shown in FIG. 11, the CSI-RS mapping scheme 1100 includes a frequency selective precoding block 1130, multiple resource element mappers 1135, multiple OFDM signal generation modules 1140, a time-domain broadband beamforming block 1190, a number N of adders 1167, and a number N of CSI-RS antenna virtualization modules 1165. Note that components 1130, 1135, 1140, 1190, 1167, and 1165 in FIG. 11 could be the same as or similar to corresponding components 930, 941, 940, 990, 967, and 965 in FIG. 9. These components in FIG. 11 can operate in the same or similar manner as the corresponding components in FIG. 11.

More particularly, the CSI-RS mapping scheme 1100 receives multiple layers 1120 of resource signals (RS) from the antenna ports (APs) of a UE (for example, UE 411).

The frequency selective precoder 1130 precodes the layers 1120 by applying a frequency selective precoding matrix $P_f$. For each received layer 1120, the frequency selective precoder 1130 outputs a precoded frequency-domain signal to a respective resource element mapper 1135.

Each resource element mapper 1135 corresponds with a respective OFDM signal generator 1140. Each resource element mapper 1135 maps the received layer 1120 to resource elements, and the corresponding OFDM signal generator 1140 uses the RE-mapped layer to output antenna port signals 1145 for M antenna ports.

As the number (N) of transmit streams is greater than the number (M) of OFDM signals (i.e., N>M), the second stage precoding block 1190 multiplies a wide-band precoding matrix Q by M input signals 1145 and generates N output signals 1195.

The CSI-RS mapping scheme 1100 includes a number N of adders 1167, each adder corresponding to a respective received layer 1120. Each adder 1167 receives and adds one of the N antenna virtualized CSI-RS signals to a respective one of the N time-domain broadband beamformed layers 1195 and outputs a combined signal to a respective CSI-RS antenna virtualization module 1165.

FIG. 12 illustrates a control signal virtualization and multiplexing method according to embodiments of the present disclosure. The control signal virtualization and multiplexing method 1200 can be implemented in the multistage beamforming architectures of FIGS. 9-10. The control signal virtualization and multiplexing method 1200 designs CRS virtualization coefficients whose combined effect with time-domain broadband precoding creates a wide beamwidth. The embodiment of the process 1200 shown in FIG. 12 is for illustration only. Other embodiments could be used without departing from the scope of this disclosure.

In this particular example, control signals are virtualized and multiplexed with data signals in frequency domain, which reduces the number of CPRI interfaces and the number of IFFT modules needed. In FIGS. 9-10, two CRS ports are mapped, yielding a wide beamwidth signal at the antenna ports. Other control signals, such as PDCCH, PBCH, PSS, SSS as well as the PDSCH relying on CRS, can be processed in a similar flow. The control signals that are mapped to the wide beamwidth signals, when transmitted from the N transmit streams and multiple physical antennas 980, 1080 form the broadcast wide beam 1205.

Also in FIGS. 9-10, the K data streams 920, 1020 are mapped, yielding multiple narrow beamwidth signals at the antenna ports. The narrow beamwidth signals of user-specific data, when transmitted from the N transmit streams and multiple physical antennas 980, 1080, form the narrow beams 1220-1227 ($a_1$ and $a_2$). The user-specific data, narrow widths of the beams 1220-1227 increases signal-to-noise ratios at the receiver UE.

The terms $p_{crs,0}$ and $p_{crs,1}$ denote two frequency domain virtualization length M vectors for CRS port 0 and CRS port 1, where $p_{crs,i}=[p_{1i}, p_{2i}, \ldots, p_{Mi}]$ for i=0,1. Equation 23 defines the signal after IFFT processing and adding CP:

$$y = \sum_{i=1}^{M} q_i x_i' = Q x' \tag{23}$$

The term $S_{crs,i}$ denotes the CRS RE. The term $p_{crs,i}$ is a wideband precoder in the sense that all the CRS REs in the entire frequency band will be multiplied by the same coefficient before multiplexing with the data stream j. Therefore, the IFFT operation does not change the effective precoding applied to CRS REs (i.e., for CRS REs a common coefficient can be extracted out). The term $S_{crs,i}$ is determined after the IFFT operation. The IFFT is a linear operation performed per antenna. Equation 24 expresses the CRS signal in a time sample (mixed with other signals):

$$Q p_{crs,i} s'_{crs,i} = \left( \sum_{j=1}^{M} p_{ji} q_j \right) s'_{crs,i} \tag{24}$$

In certain embodiments, the virtualization vectors are expressed as $p_{crs,i}=[p_{1i}, p_{2i}, \ldots, p_{Mi}]$, such that $$\left( \sum_{j=1}^{M} p_{ji} q_j \right)$$

has a wide beamwidth.

The various embodiments of a multistage beamforming architecture 800, 900, 1000 described above reduce baseband computation and reduce the throughput requirement between the DU and RRH. Table 1 summarizes a particular non-limiting example of calculated savings in of baseband computations and throughput requirements of a multistage beamforming architecture (for example, M<N) compared to a conventional architecture (for example, M=N). Other examples can yield different results of cost savings. The complexity of the transmission system does not increase with an increase in the number of transmit antennas, but depends on the number of data streams n precoding.

TABLE 1

Summary of savings in complexity by using multistage beamforming scheme

| | Conventional implementation | Multistage beamforming | Savings |
|---|---|---|---|
| K number of data streams | 8 | 8 | |
| M number of f-domain precoder output | 32 | 8 | 4x |
| N number of antennas | 32 | 32 | |
| LTE REs @20 MHz | 1200 | 1200 | |
| CPRI throughput (Gbps) | 32 | 9 | 3.5x |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multistage beamforming circuit in a wireless communication network, the circuit comprising:
   a data unit configured to:
      implement a frequency domain beamforming stage by converting K received data streams into M precoding output streams in a frequency-domain, and
      transform the M output streams to M orthogonal frequency-division multiplexing (OFDM) time domain signals;
   the data unit comprising:
   a frequency domain precoding module configured to receive and precode the K received data streams into the M precoding output streams by applying frequency domain precoding matrices:
   M Inverse Fast Fourier Transform (IFFT) processing blocks for processing the M precoding output streams to yield the M OFDM time-domain signals, each IFFT processing block configured to:
      receive a frequency-domain signal,
      map the frequency-domain signal to resource elements in a frequency domain,
      transform the frequency-domain signal to a stream of time domain samples, and
      add a cyclical prefix to the stream of time domain samples yielding an OFDM time-domain signal; and
   a remote radio head configured to implement a time-domain broadband beamforming stage by converting the M OFDM time-domain signals into N transmit streams of time-domain samples based on beamforming control signals received from the data unit, the beamforming control signals indicating a wideband precoding matrix or a set of indicators to construct the wideband precoding matrix, the remote radio head comprising a transmit antenna array configured to transmit the N transmit streams that together form broadcast beams and user-specific beams, the antenna array including a plurality of physical antennas,
   wherein the number N of transmit streams is greater than the number M of precoding output streams, and
   wherein N. M. and K are positive integers.

2. The multistage beamforming circuit of claim 1, wherein the data unit further comprises:
   $N_{CRS}$ CELL-SPECIFIC REFERENCE SIGNAL (CRS) PORTS CONFIGURED TO RECEIVE COMMON CONTROL SIGNALS AS FREQUENCY DOMAIN SIGNALS; AND $N_{CRS}$ IFFT processing blocks for processing the common control signals to yield $N_{CRS}$ OFDM time-domain signals.

3. The multistage beamforming circuit of claim 1, wherein the data unit further comprises:
an antenna virtualization module configured to receive $N_{CRS}$ common control signals as frequency domain signals, apply a common control signals specific antenna virtualization precoding to the $N_{CRS}$ frequency domain common signals to generate M virtualized common control signals; and
M adders configured to combine the M virtualized common control signals with the M precoding output streams.

4. The multistage beamforming circuit of claim 3, wherein the antenna virtualization module is further configured to:
receive $N_{CSI-RS}$ frequency-domain CSI-RS signals, and apply a CSI-RS specific antenna virtualization precoding to the $N_{CSI-RS}$ frequency-domain CSI-RS signals to generate M virtualized CSI-RS signals; and
wherein the M adders are further configured to combine the M virtualized CSI-RS signals with the M precoding output streams.

5. The multistage beamforming circuit of claim 1, further comprising a beamforming control module configured to receive uplink feedback including at least one of precoding matrix indicator (PMI) and channel-state-information (CSI), and based on the feedback, generate beamforming control signals including:
a first beamforming control signal configured to control the frequency domain precoding module to select the frequency domain precoding matrices, and
a second beamforming control signals configured to control a time-domain broadband beamforming module to select a wide-band precoding matrix.

6. The multistage beamforming circuit of claim 1, wherein the remote radio head further comprises a time-domain broadband beamforming module that includes a precoding matrix having at least one of:
rows that are Discrete Fourier Transform (DFT) vectors, and
columns that are DFT vectors; and wherein the broadcast beams comprise:
a wide beam width cell-specific reference signal (CRS), wide beam width channel-state-information reference signals (CSI-RS), and
wide beam width common control channels associated with the CRS and including at least one of: Physical Downlink Control Channel and Physical Broadcast Channel, and
wherein the user-specific beams comprise:
narrow beam width CSI-RS,
narrow beam width user equipment specific reference signal (UE-RS), and
narrow beam width UE data channels associated with UE-RS.

7. The multistage beamforming circuit of claim 1, wherein the remote radio head comprises:
a time-domain broadband beamforming module configured to receive and precode the M output streams into the N precoded output signals using a wideband precoding matrix; and
N transmission paths respectively coupled to at least one of the physical antennas, each transmission path Including a series of a digital-to-analog converter, a mixer, and a power amplifier together configured to form a respective one of the N transmit streams using a respective one of the N precoded output signals.

8. The multistage beamforming circuit of claim 7, wherein the remote radio head further comprises:
an antenna virtualization module configured to receive $N_{CSI-RS}$ time-domain CSI-RS signals, and apply a CSI-RS specific antenna virtualization precoding to the $N_{CSI-RS}$ time-domain CSI-RS signals to generate N virtualized CSI-RS signals; and
N adders configured to combine the N virtualized CSI-RS signals with the N precoded output signals.

9. The multistage beamforming circuit of claim 8, wherein the antenna virtualization module is further configured to:
receive $N_{CRS}$ common control time-domain signals from the data unit, and
apply a common control signals specific antenna virtualization precoding to the $N_{CRS}$ time domain common signals to generate N virtualized common control signals, and
wherein the N adders are further configured to combine the N virtualized common control signals with the N precoded output signals.

10. The multistage beamforming circuit of claim 1, further comprising a common public radio interface (CPRI) interface configured to transmit the M precoding output streams from the data unit to the remote radio head.

11. A base station for multistage beamforming in a wireless communication network, the base station comprising:
a data unit configured to implement a frequency domain beamforming stage, the data unit comprising:
a frequency domain precoding module configured to receive and precode K data streams into M precoding output streams in a frequency domain by applying frequency domain precoding matrices,
M pairs of an Inverse Fast Fourier Transform (IFFT) processing block coupled to M cyclic prefix processing block, each pair configured to transform the M precoding output streams into M orthogonal frequency-division multiplexing (OFDM) time-domain signals, wherein each IFFT processing block is configured to receive a frequency-domain signal, map the frequency-domain signal to resource elements in a frequency domain, transform the received frequency-domain signal to a stream of time domain samples, and each cyclic prefix processing block is configured to add a cyclical prefix to the stream of time domain samples to generate the M precoding output streams; and
a remote radio head (RRH) configured to implement a time-domain broadband beamforming stage by converting the M OFDM time-domain signals into N transmit streams of time-domain samples based on beamforming control signals received from the data unit, the beamforming control signals indicating a wide-band precoding matrix or a set of indicators to construct the wideband precoding matrix, the RRH comprising:
a time-domain broadband beamforming module configured to receive and precode the M output streams into N precoded output signals using a wide-band precoding matrix,
a transmit antenna array configured to transmit the N transmit streams that together form broadcast beams and user-specific beams, the antenna array including a plurality of physical antennas, wherein the number N of transmit streams is greater than the number M of precoding output streams in the time domain, and
wherein N. M. and K are positive integers.

12. The base station of claim 11, wherein the data unit further comprises:
   $N_{CRS}$ cell-specific reference signal (CRS) ports configured to receive common control signals as frequency domain signals; and
   $N_{CRS}$ IFFT processing blocks for processing the common control signals to yield $N_{CRS}$ OFDM time-domain signals.

13. The base station of claim 11, wherein the data unit further comprises:
   $N_{CRS}$ CELL-SPECIFIC REFERENCE SIGNAL (CRS) PORTS, EACH PORT CONFIGURED TO RECEIVE COMMON CONTROL SIGNALS IN THE FREQUENCY-DOMAIN;
   M resource element mappers configured to map the M precoding output streams to resource elements in a frequency domain to generate M resource-element-mapped precoding output streams; and
   $N_{CRS}$ RESOURCE ELEMENT MAPPERS CONFIGURED TO MAP THE COMMON CONTROL SIGNALS TO RESOURCE ELEMENTS IN THE FREQUENCY DOMAIN TO GENERATE $N_{CRS}$ RESOURCE-ELEMENT-MAPPED COMMON CONTROL SIGNALS;
   an antenna virtualization module configured to apply a common control signals specific antenna virtualization precoding to the $N_{CRS}$ resource-element-mapped common control signals to generate M virtualized common control signals in the frequency domain; and
   M adders, each of the M adders configured to combine the M virtualized common control signals with the M resource-element-mapped precoding output streams, and
   wherein each of the M IFFT processing blocks is coupled to a respective one of the M adders and further configured to receive a combined frequency-domain signal from the one of the M adders as the received frequency-domain signal.

14. The base station of claim 11, wherein the data unit further comprises:
   $N_{CRS}$ CRS ports, each CRS port configured to receive one of $N_{CRS}$ common control signals in the frequency-domain;
   $N_{CSI-RS}$ CSI-RS ports, each CSI-RS port configured to receive one of $N_{CSI-RS}$ CSI-RS signals in the frequency-domain;
   an antenna virtualization module configured to apply a common control signals specific antenna virtualization precoding to the $N_{CRS}$ common control signals to generate M virtualized common control signals in the frequency domain, and to apply a CSI-RS specific antenna virtualization precoding to the $N_{CSI-RS}$ frequency-domain CSI-RS sign is to generate virtualized CSI-RS signals; and
   M adders configured to combine the M virtualized CSI-RS signals with the M preceding output streams, each adder configured to combine a respective one of the M virtualized common control signals with a respective one of the M preceding output streams,
   wherein each of the M IFFT processing blocks is coupled to a respective one of the M adders and further configured to receive a combined frequency-domain signal from the adder as the received frequency-domain signal.

15. The base station of claim 11, wherein the time-domain broadband beamforming module comprises a preceding matrix having at least one of:
   rows that are Discrete Fourier Transform (DFT) vectors, and
   columns that are DFT vectors; and
   wherein the broadcast beams comprise:
      a wide beam width cell-specific reference signal (CRS),
      wide beam width channel-state-information reference signals (CSI-RS), and
      wide beamwidth common control channels associated with the CRS and including at least one of: Physical Downlink Control Channel and Physical Broadcast Channel, and
   wherein the user-specific beams comprise:
      narrow beam width CSI-RS,
      narrow beam width user equipment specific reference signal (UE-RS), and
      narrow beam width UE data channels associated with UE-RS.

16. The base station of claim 11, wherein the remote radio head further comprises:
   an antenna virtualization module configured to receive $N_{CSI-RS}$ time-domain CSI-RS signals, and apply a CSI-RS specific antenna virtualization precoding to the $N_{CSI-RS}$ time-domain CSI-RS signals to generate N virtualized CSI-RS signals; and
   N adders configured to combine the N virtualized CSI-RS signals with the N precoded output signals.

17. The base station of claim 16, wherein the antenna virtualization module is further configured to:
   receive $N_{CRS}$ common control time-domain signals from the data unit, and
   apply a common control signals specific antenna virtualization precoding to the $N_{CRS}$ common control time domain signals to generate N virtualized common control signals, and
   wherein the N adders are further configured to combine the N virtualized common control signals with the N precoded output signals.

18. The base station of claim 11, further comprising a beamforming control module configured to receive uplink feedback including at least one of precoding matrix indicator (PM) and channel-state-information (CSI), and based on the feedback, generate beamforming control signals including:
   a first beamforming control signal configured to control the frequency domain precoding module to select the frequency domain precoding matrices, and
   a second beamforming control signals configured to control a time-domain broadband beamforming module to select a wide-band precoding matrix.

19. A multistage beamforming method comprising: implementing a frequency domain beamforming stage by converting K data streams in a frequency-domain into M precoding output streams in a frequency domain, wherein converting the K data streams into M precoding output streams comprises receiving and precoding the K data streams into M precoding output streams by applying frequency domain precoding matrices;
   transforming the M output streams to M orthogonal frequency-division multiplexing (OFDM) time-domain signals by:
      mapping the M output streams to resource elements in a frequency domain to generate M mapped frequency-domain signals, transforming the M mapped frequency-domain signals to M streams of time domain samples using Inverse Fast Fourier Transform (IFFT), and adding a cyclical prefix to each of the M streams of time domain samples yielding the M OFDM time-domain signals:

implementing a time-domain broadband beamforming stage by converting the M OFDM time-domain signals into N transmit streams of time-domain samples based on beamforming control signals received, the beamforming control signals indicating a wide-band precoding matrix or a set of indicators to construct the wideband precoding matrix; and transmitting, by a transmit antenna array including a plurality of physical antennas, the N transmit streams that together form broadcast beams and user-specific beams, wherein the number N of transmit streams is greater than the number M of precoding output streams, and wherein N. M. and K are positive integers.

20. The method of claim 19, wherein converting the M OFDM time-domain signals into the N transmit streams comprises:

receiving and precoding the M OFDM time-domain signals into the N transmit streams of time-domain samples using a wide-band precoding matrix.

21. The method of claim 19, further comprising one of:

applying a common control signals specific antenna virtualization precoding to common control signals to generate N virtualized common control signals in the time domain, and combining the N virtualized common control signals with the N transmit streams;

applying a common control signals specific antenna virtualization precoding to common control signals to generate M virtualized common control signals in the frequency domain, and combining the M virtualized common control signals with the M precoding output streams; and further comprising one of:

applying a CSI-RS specific antenna virtualization precoding to time-domain CSI-RS signals to generate N virtualized CSI-RS signals, and combining the N virtualized CSI-RS signals with the N transmit streams; and applying a CSI-RS specific antenna virtualization precoding to frequency domain CSI-RS signals to generate M virtualized CSI-RS signals, and combining the M virtualized CSI-RS signals with the with the M precoding output streams.

22. The method of claim 19, wherein converting the M OFDM time-domain signals into the N transmit streams of time-domain samples comprises using a precoding matrix having at least one of:

rows that are Discrete Fourier Transform (DFT) vectors, and columns that are DFT vectors; and wherein the broadcast beams comprise:

a wide beamwidth cell-specific reference signal (CRS), wide beam width channel-state-information reference signals (CSI-RS), and wide beamwidth common control channels associated with the CRS and including at least one of: Physical Downlink Control Channel and Physical Broadcast Channel, and wherein the user-specific beams comprise:

narrow beamwidth CSRS, narrow beamwidth user equipment specific reference signal (UE-RS), and narrow beamwidth UE data channels associated with UE-RS.

* * * * *